United States Patent
Sullivan et al.

(10) Patent No.: US 9,515,867 B2
(45) Date of Patent: Dec. 6, 2016

(54) INTELLIGENT COMMAND BUILDER AND EXECUTER

(71) Applicant: Verizon Patent and Licensing Inc., Basking Ridge, NJ (US)

(72) Inventors: Michael J. Sullivan, Groton, MA (US); Etan Orlian, Spring Valley, NY (US); Patrick C. Helbach, Wilton, CT (US); Jonathan Leigh, Stormville, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 335 days.

(21) Appl. No.: 13/676,415

(22) Filed: Nov. 14, 2012

(65) Prior Publication Data

US 2014/0136672 A1 May 15, 2014

(51) Int. Cl.
*G06F 15/173* (2006.01)
*H04L 12/24* (2006.01)

(52) U.S. Cl.
CPC ....... *H04L 41/0226* (2013.01); *H04L 41/0273* (2013.01); *H04L 41/022* (2013.01)

(58) Field of Classification Search
CPC .. G06F 9/4443; G06F 9/45512; G06F 17/276; G06F 17/30038; G06F 3/0481; G06F 3/04895; G06F 13/387
USPC 345/738, 172; 707/203, 5; 398/25; 370/254, 352; 715/780, 503, 719; 710/33; 709/203, 223
See application file for complete search history.

(56) References Cited

U.S. PATENT DOCUMENTS

| | | | |
|---|---|---|---|
| 6,564,213 B1* | 5/2003 | Ortega et al. | |
| 7,509,400 B1* | 3/2009 | Tanner | G06F 13/387 370/352 |
| 2004/0098422 A1* | 5/2004 | Levesque et al. | 707/203 |
| 2004/0196309 A1* | 10/2004 | Hawkins | 345/738 |
| 2004/0239638 A1* | 12/2004 | Swanson | G06F 3/04895 345/172 |
| 2005/0047350 A1* | 3/2005 | Kantor et al. | 370/254 |
| 2005/0091424 A1* | 4/2005 | Snover et al. | 710/33 |
| 2007/0055922 A1* | 3/2007 | Martynov et al. | 715/503 |
| 2009/0226164 A1* | 9/2009 | Mayo et al. | 398/25 |
| 2011/0145786 A1* | 6/2011 | Fayed et al. | 717/115 |
| 2012/0192096 A1* | 7/2012 | Bowman | G06F 3/0481 715/780 |
| 2013/0080514 A1* | 3/2013 | Gupta et al. | 709/203 |
| 2014/0040741 A1* | 2/2014 | van Os et al. | 715/719 |

* cited by examiner

*Primary Examiner* — Dustin Nguyen

(57) ABSTRACT

A computer device may include logic configured to receive a selection of a circuit, obtain information relating to the selected circuit, and provide a list of network elements associated with the selected circuit based on the obtained information relating to the selected circuit. The logic may further be configured to receive a selection of a network element type or network element identifier associated with the provided list of network elements, identify a list of commands based on the selection of a network element type or network element identifier, perform a command auto-completion based on the identified list of commands, and send a completed command to be executed on a network element identified by the completed command.

20 Claims, 37 Drawing Sheets

KEYSTROKE SEQUENCE:
R

KEYSTROKE SEQUENCE:
R T

KEYSTROKE SEQUENCE:
R T C

KEYSTROKE SEQUENCE:
R T C O

KEYSTROKE SEQUENCE:
R T C O A

FIG. 8G

KEYSTROKE SEQUENCE:
R T C O A A

KEYSTROKE SEQUENCE:
R T C O A A L

KEYSTROKE SEQUENCE:
RTCOAAL10

KEYSTROKE SEQUENCE:
R T C O A A L 1 0 (down) (down)

FIG. 8K

KEYSTROKE SEQUENCE:
R T C O A A L 1 0 (down) (down) (down) (enter) (EXECUTE)

KEYSTROKE SEQUENCE:
(TID menu)

KEYSTROKE SEQUENCE:
(TID menu) (TID selection) (AID menu) (AID selection)

KEYSTROKE SEQUENCE:
(TID menu) (TID selection) (AID menu) (AID selection)
R T C

KEYSTROKE SEQUENCE:
(command selection)

KEYSTROKE SEQUENCE:
(command selection)

KEYSTROKE SEQUENCE:
(AID menu)

KEYSTROKE SEQUENCE:
(AID menu) (AID selection)

KEYSTROKE SEQUENCE:
(AID menu) (AID selection) (EXECUTE)

KEYSTROKE SEQUENCE:
(TID menu) (TID selection) (AID menu) (AID selection)
D L

KEYSTROKE SEQUENCE:
(TID menu) (TID selection) (AID menu) (AID selection)
D L C (EXECUTE)

INTELLIGENT COMMAND BUILDER AND EXECUTER

BACKGROUND INFORMATION

A communication network may include a large number of network elements. For example, an optical circuit may include Synchronous Optical Networking (SONET) multiplexers, digital cross-connects, and/or wavelength selectable switches (WSSs). A technician may interact with a network element by sending a command to the network element. For example, a technician may send a command requesting a status associated with a network element or may send a command to change a configuration of the network element. The commands may require multiple arguments and a technician may spend a significant amount of time generating network element commands.

BRIEF DESCRIPTION OF THE DRAWINGS

FIGS. 8A-8M are diagrams of user interfaces illustrating a first example of command building and execution according to an implementation described herein;

DETAILED DESCRIPTION OF PREFERRED EMBODIMENTS

Figure 1:
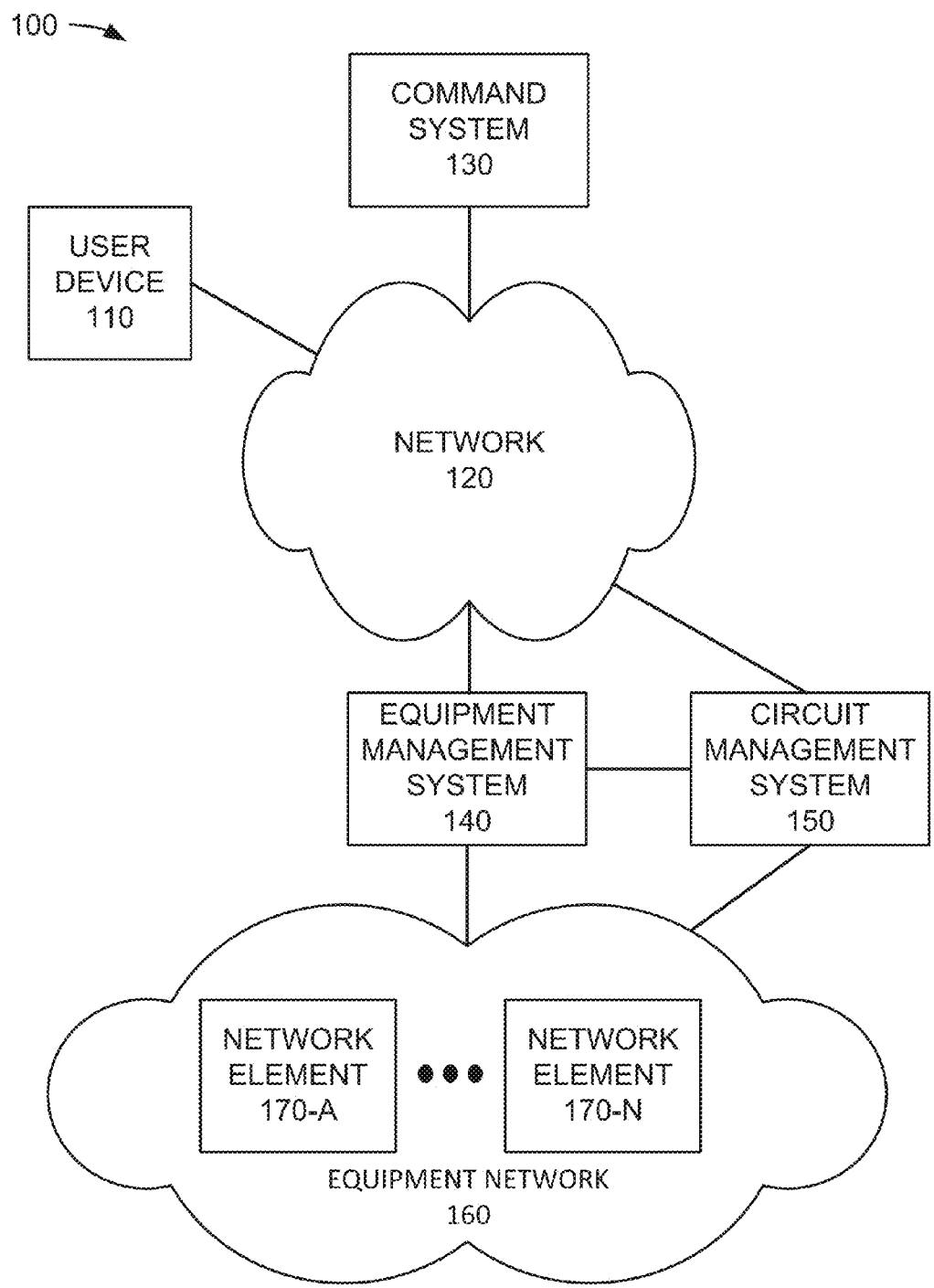
FIG. 1 is a diagram illustrating an exemplary environment according to an implementation described herein.

The following detailed description refers to the accompanying drawings. The same reference numbers in different drawings identify the same or similar elements.

An implementation described herein relates to a command builder and executer system. A command builder may capture a user's input as keys are pressed and may, in real time or near real time, match the user input against possible values defined by syntax or rules associated with a set of commands. If a set of keystrokes identifies a portion of a command, then the set of keystrokes is replaced by the identified command portion. As the user continues to type the command, the command builder continues to narrow the command. When the full command name is identified, the command builder may process additional fields, associated with the identified command name, by matching the user input against possible values. For example, a command may include a field that identifies devices or components of devices. A device, such as a network element, may be identified using a target identifier (TID), and a component of the network element, such as a port or an interface card, may be identified using an access identifier (AID). The command builder may maintain a list of potential values associated with a command, such as a list of available TIDs, and/or a list of available AIDs for a particular TID. As the user enters information, the command builder may match the keystrokes/input to a list of available identifiers, based on a particular field being completed, and may replace the information entered by the user with an identifier when the choices have been narrowed down to a unique identifier.

As keys are being pressed, or information is being entered, by the user, a command list, or an identifier list, may be displayed beneath a command text box. A user may select an entry from the displayed list or may continue to enter keys to narrow down the choices. Only entries that match the entered information may remain in the selected list and the selected list may be reduced after each keystroke. When a command has been completed, the command may be submitted for execution on a network element identified by the completed command. A network may include a large number of network elements and a language used to communicate with the network elements may include a large number of commands. The use of a command builder may simplify generation of commands and may enable a user to save the number of keystrokes required to enter a command.

In one implementation, the command builder may be implemented to process Transaction Language 1 (TL1) commands to network elements. In another implementation, the command builder may be implemented to process commands in another man-machine language (MML) or another type of language used to communicate with other devices. For example, command builder may be implemented to process generation of Simple Network Management Protocol (SNMP) commands or protocol data unit generation, may be implemented to process generation of Simple Object Access Protocol (SOAP) commands, and/or may be implemented to process commands in another language.

FIG. 1 is a diagram illustrating an exemplary environment 100 according to an implementation described herein. As shown in FIG. 1, environment 100 may include a user device 110, a network 120, a command system 130, an equipment management system 140, a circuit management system 150, and an equipment network 160.

User device 110 may include any device capable of communicating with a server device using, for example, a browser application (e.g., Internet Explorer, Mozilla Firefox, Google Chrome, Apple Safari, Opera, etc.). User device 110 may access web-based application hosted by command system 130. User device 110 may include a desktop computer; a laptop computer; a tablet computer; a mobile communication device, such as a mobile phone, a smart phone, a tablet computer, a laptop, a personal digital assistant (PDA), or another type of portable communication device; and/or another type of computation and/or communication device.

Network 120 may enable user device 110, command system 130, equipment management system 140, and/or circuit management system 150 to communicate with each other. Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Command system 130 may include one or more devices, such as server devices, that facilitate manage command building and execution for a user accessing command system 130 using user device 110. For example, when user device 110 accesses command system 130, command system 130 may provide a command builder application to user device 110. The command builder application may be implemented as a script that is executed by the browser application running on user device 110. Command system 130 may obtain information about a circuit selected by the user from circuit management system 150, may obtain information about commands associated with network elements included in the selected circuit, and may provide the information to the command builder application.

Equipment management system 140 may manage equipment, such as network elements, in equipment network 160. For example, equipment management system 140 may receive a command to be executed from command system 130 (or directly from user device 110), and may execute the command on a specified network element.

Circuit management system 150 may manage circuits associated with equipment network 160. A circuit may correspond to an optical light path that includes two or more network elements connected via optical fibers. Circuit management system 150 may provision, configure, update, and/or remove circuits associated with equipment network 160 and may manage information associated with the circuits. For example, circuit management system 150 may include information about particular network elements associated with a circuit, TIDs and/or network element types associated with the particular network elements, AIDs associated with particular network elements in the circuits, and/or other information associated with the circuit. Circuit management system 150 may provide information about a circuit to command system 130 upon request. While equipment management system 140 and circuit management system 150 have been described as separate components of environment 100, in other implementations, equipment management system 140 and circuit management system 150 may be part of a same component of environment 100.

Equipment network 160 may include a network that include equipment, such as network elements, that may receive commands from command system 130 (and/or directly from user device 110) via equipment management system 140. In one implementation, some or all of equipment network 160 may be part of network 120. In another implementation, some or all of equipment network 160 may be separate from network 120. Equipment network 160 may include network elements 170-A to 170-N (referred to herein collectively as "network elements 170" and individual as "network element 170"). Network element 170 may include one or more devices that interconnect optical links and/or manage a light path to be switched from one optical channel to another optical channel. For example, network element 170 may include a Synchronous Optical Networking (SONET) multiplexer, a digital cross-connect device, a wavelength selectable switch (WSS), and/or another type of optical device.

While equipment network 160 and network elements 170 have been described in the context of circuits and optical light paths, in other implementations, equipment network 160 and/or network elements 170 may include different types of connections and/or devices. For example, equipment network 160 may include an electrical network, such as an Ethernet network, a Frame Relay network, and/or an Asynchronous Transfer Mode (ATM) network, and network elements 170 may include devices that route traffic through the particular type of electrical network (e.g., Ethernet switches, ATM switches, Frame Relay device, etc.).

Devices in environment 100 may communicate as follows. A user may access a web site hosted by command system 150 using user device 110. Command system 130 may provide a command builder application to user device 110 in response to the web site being accessed. The command builder application may be implemented using, for example, a Java application. The user may select a circuit for which one or more commands are to be executed. Command system 130 may request information relating to the circuit from circuit management system 150. Circuit management system 150 may provide, to command system 130, information relating to the circuit, such as, for example, TIDs for network elements 170 associated with the circuit, network element types associated with network elements 170, and/or AIDs for each network element 170 that are associated with the circuit.

Command system 130 may determine a list of commands for each network element type included in the circuit based on a command database associated with command system 130. Command system 130 may provide the received circuit information and the determined lists of commands to the command builder application running on user device 110. The user may generate a command associated with the selected circuit and the command builder application may use the received information to perform auto-completion for a command name and/or any identifiers associated with the command. The user may submit a completed command for execution and command system 130 may provide the completed command to equipment management system 140 to execute the command. Equipment management 140 may execute the received command on a particular network element 170 specified in the received command.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
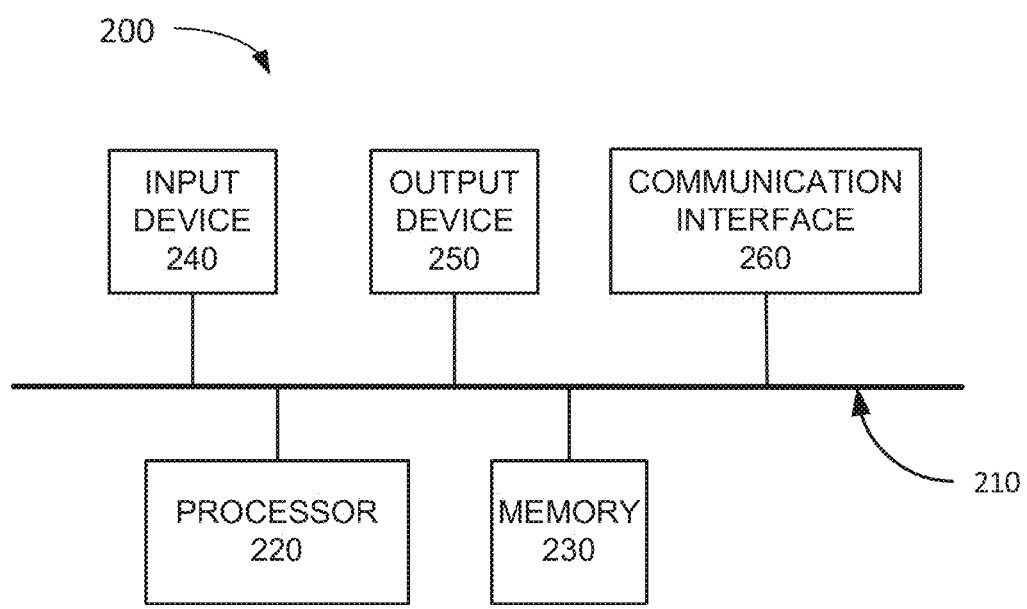
FIG. 2 is a diagram illustrating an exemplary device that may be included in a component of the environment of FIG. 1 according to an implementation described herein.

FIG. 2 is a diagram illustrating an exemplary device 200 that may be included in a component of the environment of FIG. 1 according to an implementation described herein. User device 110, command system 130, equipment management system 140, circuit management system 150, and/or other devices in environment 100, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to building and execution of commands for network elements. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3A:
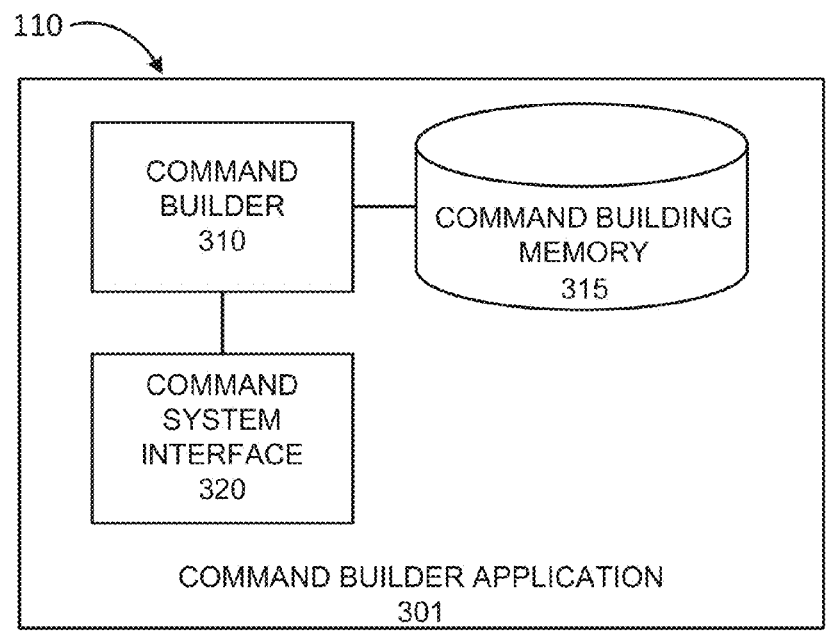
FIG. 3A is a diagram illustrating exemplary functional components of the user device of FIG. 1 according to an implementation described herein.

FIG. 3A is a diagram illustrating exemplary functional components of user device 110 according to an implementation described herein. The functional components of user device 110 may be implemented, for example, via processor 220 executing instructions from memory 230. Alternatively, some or all of the functional components of user device 110 may be implemented via hard-wired circuitry. As shown in FIG. 3A, user device 110 may include a command builder application 301. In one implementation, command builder application 301 may be provided to user device 110 when user device 110 accesses command system 130. For example, user device 110 may access command system 130 using a browser application and command builder application 301 may be provided as a Java application to the browser application. In another implementation, command builder application 301 may be installed on user device 110 and may not require a user to access command system 130 using a browser application.

Command builder application 301 may include a command builder 310, a command building memory 315, and a command system interface 320. Command builder 310 may receive a circuit selection from a user and may obtain information relating to the selected circuit from command system 130. Command builder 310 may perform auto-completion of command names, identifiers, and/or other fields associated with a command, based on the obtained information relating to the selected circuit. For example, command builder 310 may receive a selection of a network element type, or of a network element identifier, from the user and may provide a list of commands associated with a network element type corresponding to the selection. The user may then select a command from the provided list or may start typing out a command. Each key that the user enters may reduce the list of displayed commands based on command names that match the entered keys. Once a command name is entered, command builder 310 may present a list of possible values for a field (e.g., TID values, AID values, etc.) associated with the command name and the user may select one of the presented values or may start entering keys to define a value. After each keystroke, the list of values may be reduced to match the entered input. The user may at any point make a selection from the presented list of values or may continue to type until only one possible value remains in the list. Command builder 310 may automatically enter the complete value into a command text box when a value is uniquely identified by the user's keystroke. Command builder 310 may append a delimiter and may repeat an auto-completion process for a next field of the command, repeating the process until all required fields of the command have been specified. Command builder 310 may submit a completed command to command system 130 (or directly to equipment management system 140) for execution.

Command building memory 315 may store information about network elements associated with a selected circuit. Exemplary information that may be stored in command building memory 315 is described below with reference to FIG. 4.

Command system interface 320 may interact with command system 130. For example, command system interface 320 may request information relating to a circuit selected by the user and may obtain the requested information from command system 130. Furthermore, command system interface 320 may submit a completed command for execution to command system 130 (or directly to equipment management system 140).

Although FIG. 3A shows exemplary functional components of user device 110, in other implementations, user device 110 may include fewer functional components, different functional components, differently arranged functional components, or additional functional components than depicted in FIG. 3A. Additionally or alternatively, one or more functional components of user device 110 may perform functions described as being performed by one or more other functional components of user device 110.

Figure 3B:
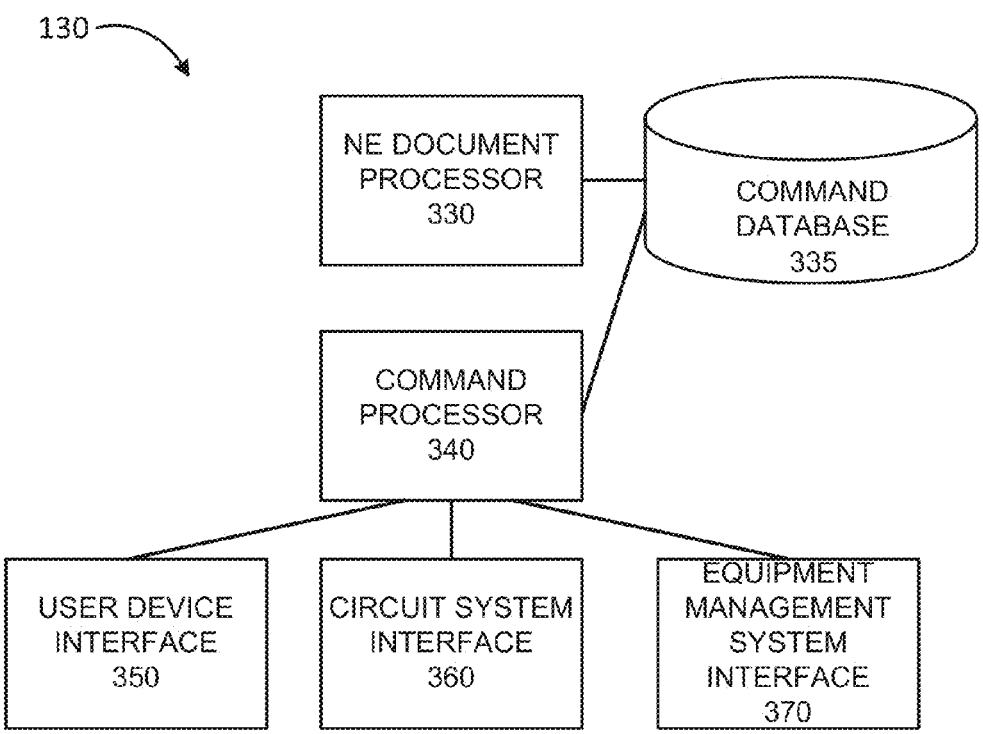
FIG. 3B is a diagram illustrating exemplary functional components of the command system of FIG. 1 according to an implementation described herein.

FIG. 3B is a diagram illustrating exemplary functional components of command system 130 according to an implementation described herein. The functional components of command system 130 may be implemented, for example, via processor 220 executing instructions from memory 230. Alternatively, some or all of the functional components of command system 130 may be implemented via hard-wired circuitry. As shown in FIG. 3B, command system 130 may include a network element (NE) document processor 330, a command database 335, a command processor 340, a user device interface 350, a circuit system interface 360, and an equipment management system interface 370.

NE document processor 330 may obtain a document associated with a particular network element type and may process the document to retrieve information relating to commands associated with the particular network element type. As an example, NE document processor 330 may access a web site associated with a manufacturer of the particular network element type and may search the web site for a document that specifies commands for the particular network element type (e.g., a document that lists a make and model of a network element and lists and describes the commands for which the make and model of the network element is configured). As another example, a document may be provided to NE document processor 330 as input along with a request to process the document with respect to a particular network element type. NE document processor 330 may parse the document to retrieve a list of commands as well as the syntax, required fields, and/or description associated with each command. The retrieved information may be stored in command database 335. Command database 335 may store lists of commands associated with particular network element types.

Command processor 340 may process requests for information relating to commands and/or may process completed commands. For example, command processor 340 may receive a request for information relating to a circuit from user device 110. Command processor 340 may request the information, via circuit system interface 360, from circuit management system 150. Command processor 340 may receive the requested information and may determine network element types associated with the circuit. Command processor 340 may access command database 335 to obtain lists of commands for the network element types associated with the circuit. Command processor 340 may provide the circuit information, along with the lists of commands, to user device 110. Furthermore, command processor 340 may receive a completed request from user device 110 along with a request to execute the completed command. Command processor 340 may forward the completed command for execution to equipment management system 140, via equipment management system interface 370.

User device interface 350 may communicate with user device 110. For example, user device interface 350 may receive requests for information relating to a circuit and may provide the requested information to user device 110. Furthermore, user device interface 350 may receive a completed command from user device 110 for execution.

Circuit system interface 360 may communicate with circuit management system 150. For example, circuit system interface 360 may contact circuit management system 150 to request information relating to a circuit and may receive the requested circuit information and forward the received circuit information to command processor 340.

Equipment management system interface 370 may communicate with equipment management system 140. For example, equipment management system interface 370 may forward a completed command to equipment management system 140 for execution and may receive confirmation that the command has been successfully completed (or may receive an error message if the command has not been successfully completed). As another example, equipment management system interface 370 may forward a command that requests information from network element 170 and may receive the requested information from network element 170 via equipment management system 140. Equipment management system interface 370 may forward the received requested information to user device 110.

Although FIG. 3B shows exemplary functional components of command system 130, in other implementations, command system 130 may include fewer functional components, different functional components, differently arranged functional components, or additional functional components than depicted in FIG. 3B. Additionally or alternatively, one or more functional components of command system 130 may perform functions described as being performed by one or more other functional components of command system 130.

Figure 4:
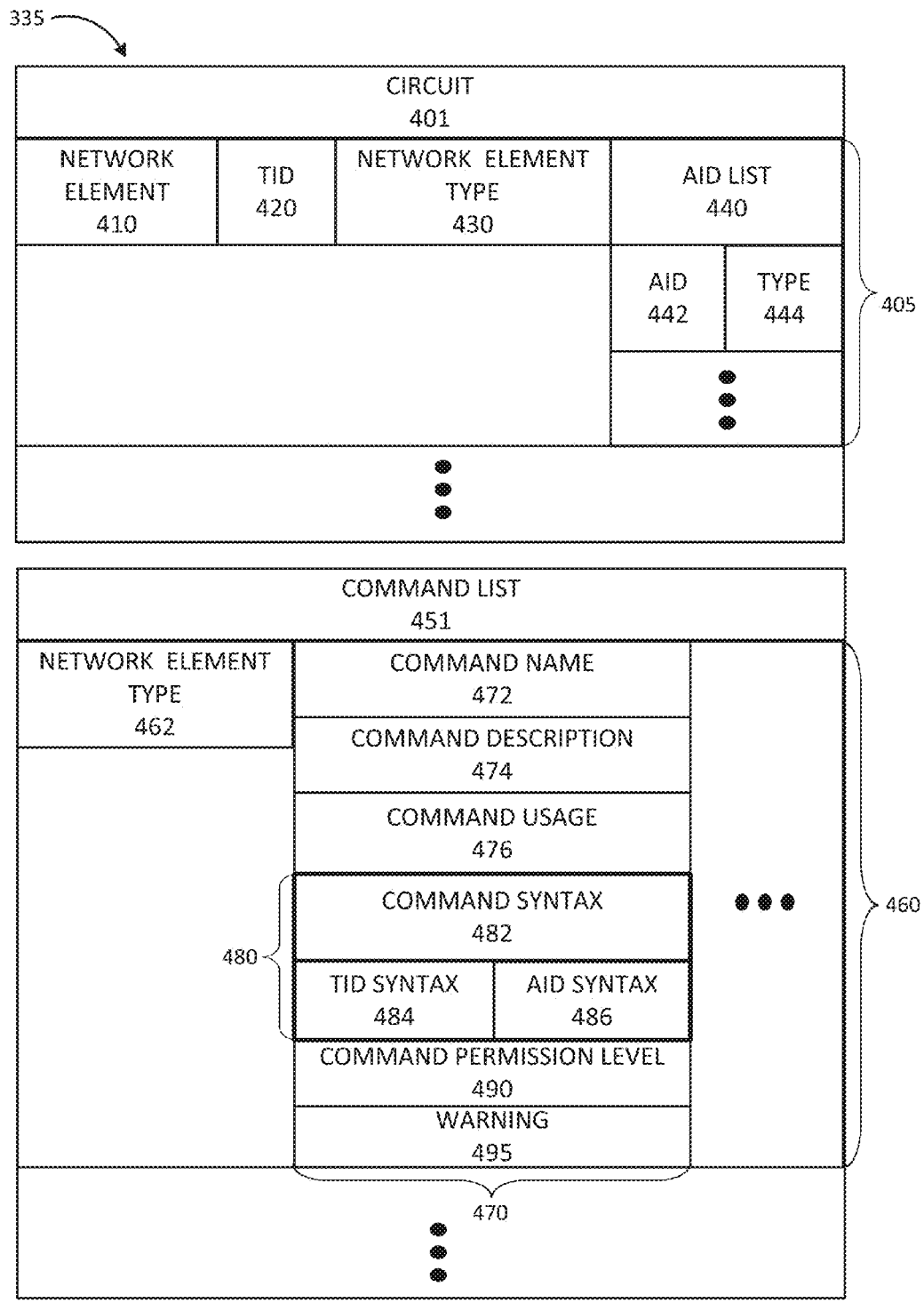
FIG. 4 is a diagram illustrating exemplary components of a command building memory according to an implementation described herein.

FIG. 4 is a diagram illustrating exemplary components of command building memory 315 according to an implementation described herein. As shown in FIG. 4, command building memory 315 may include one or more circuit records 401 (referred herein collectively as "circuit records 401" and individually as "circuit record 401") and a command list record 451. Circuit record 401 may store information relating to a particular selected circuit. For example, a user may select a circuit via command builder application 301, command builder application 301 may request information relating to the selected circuit from command system 130, and may receive the requested information, may generate a new circuit record 401 and may store the received information in the generated circuit record 401. Circuit record 401 may include one or more network element entries 405 (referred to herein collectively as "network element entries 405" and individually as "network element entry 405"). Network element entry 405 may store information relating to a particular network element included in the circuit. Thus, for example, if the circuit interconnects ten network elements, circuit record 401 may include ten network element entries 405.

Network element entry 405 may include a network element field 410, a TID field 420, a network element type field 430, and an AID list field 440. Network element field 410 may identify a particular network element within the circuit (e.g., network element #1, etc.). TID field 420 may store a TID associated with the network element. Network element type field 430 may store information identifying a network element type associated with the particular network element (e.g., a make and model number of the network element).

AID list field 440 may include one or more AID entries associated with the network element. Each AID entry may include an AID field 442 and a type field 444. AID field 442 may store an AID associated with a particular component of the network element (e.g., a port, interface card, etc.). Type field 444 may store information identifying a particular type of component associated with the corresponding AID (e.g., an Optical Carrier (OC) 12 interface, an OC 48 interface, an OC 192 interface, etc.).

Command list record 451 may store information relating to particular commands. In some implementations, command list record 451 may be obtained from command database 335 of command system 130 and may include a list of all network element types present in equipment network 160. In other implementations, command list record 451 may be obtained in response to the user selecting a circuit and may include command information for network element types included in the selected circuit.

Command list record 451 may include one or more network element type records 460 (referred to herein collectively as "network element type records 460" and individually as "network element type record 460"). Each network element type record 460 may include information relating to commands associated with a particular network element type, and may include a network element type field 462 and one or more command fields 470 (referred to herein collectively as "command fields 470" and individually as "command field 470"). Network element type field 470 may include information identifying a particular network element type (e.g., make and model of a network element). Command field 470 may include a particular command that may be executed on the particular network element type.

Command field 470 may include a command name field 472, a command description field 474, a command usage field 476, a command syntax information field 480, a command permission level field 490, and a warning field 495. Command name field 472 may store a command name associated with the particular command. Command description field 474 may store a description of the particular command. Command usage field 476 may store information relating to command usage, such as how often the particular command is used. Command usage information may be used to present a list of most commonly used commands to the user. Command syntax information field 480 may store information relating to the syntax of the particular command. Command syntax information field 480 may include a command syntax field 482, a TID syntax field 484, and an AID syntax field 486.

Command syntax field 482 may store information relating to the syntax of the particular command, such as the sequence of command components, the syntax of each command component, and/or an identifier type associated with a command component. TID syntax field 484 may specifically identify a command component and syntax associated with specifying a TID. Command builder 310 may use TID syntax field 484 to identify that a next command component corresponds to a TID identifier and may auto-fill the TID identifier into the command based on a TID specified by the user. AID syntax field 484 may specifically identify a command component and syntax associated with specifying an AID. Command builder 310 may use AID syntax field 486 to identify that a next command component corresponds to an AID identifier and may auto-fill the AID identifier into the command based on an AID specified by the user.

Command permission level 490 may identify a permission level associated with the particular command. Command building application 301 may check to make sure a user is associated with the required permission level before enabling the user to execute the particular command. For example, a command may require administrator privileges and a user may need to have administrator access to be allowed to execute the command. Warning field 495 may include a warning that may be provided to the user before a command is executed. For example, a command may be considered highly intrusive if the command changes or deletes an important configuration. Thus, a user may be provided with a warning if a highly intrusive command is to be executed.

Although FIG. 4 shows exemplary components of command building memory 315, in other implementations, command building memory 315 may include fewer components, different components, differently arranged components, or additional components than depicted in FIG. 4. For example, while FIG. 4 shows a list of commands available for each network element type, in other implementations, the list of commands may be organized differently. As an example, command list record 451 may store a list of commands and each particular command may include a field that includes a list of network element types that are configured to accept the particular command (along with an associated command permission level).

Figure 5:
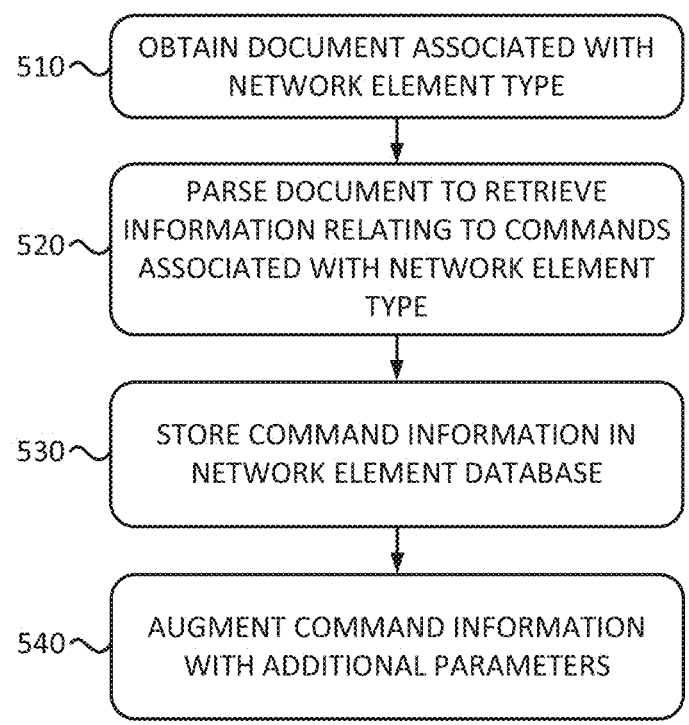
FIG. 5 is a flow chart of an exemplary process for obtaining command information associated with a network element according to an implementation described herein.

FIG. 5 is a flow chart of an exemplary process for obtaining command information associated with a network element according to an implementation described herein. In one implementation, the process of FIG. 5 may be performed by command system 130. In other implementations, some or all of the process of FIG. 5 may be performed by another device or a group of devices separate from command system 130 and/or including command system 130.

The process of FIG. 5 may include obtaining a document associated with a network element type (block 510). For example, NE document processor 330 may access a web site associated with a manufacturer of the particular network element type and may search the web site for a document that specifies commands for the particular network element type (e.g., a document that lists a make and model of a network element and lists, describes, and/or identifies the commands for which the make and model of the network element is configured). As another example, a document may be provided to NE document processor 330 as input along with a request to process the document with respect to a particular network element type.

The document may be parsed to retrieve information relating to commands associated with a network element type (block 520). For example, NE document processor 330 may parse the document to retrieve a list of commands as well as the syntax, required fields, and/or description associated with each command that can be executed. The command information may be stored in a network element database (block 530). For example, NE document processor 330 may store the retrieved information in command database 335. In some implementations, the command information may be augmented with additional parameters (block 540). For example, for some commands, additional parameters may exist with known values, which may be added to the structure of the command fields. In some situations, the additional parameters may be parsed out of documents. In other situations, the additional parameters may be developed independently of any parsed documents.

Figure 6:
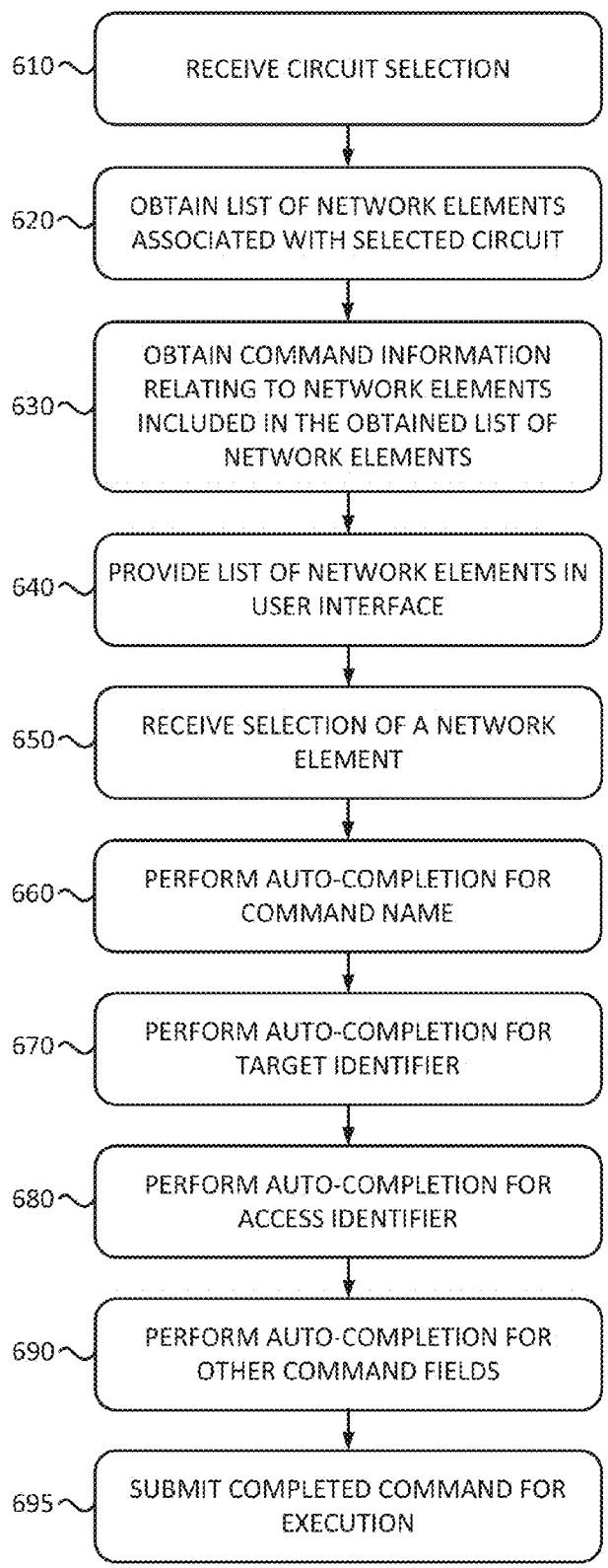
FIG. 6 is a flow chart of an exemplary process for building a command according to an implementation described herein.

FIG. 6 is a flow chart of an exemplary process for building a command according to an implementation described herein. In one implementation, the process of FIG. 6 may be performed by user device 110. In other implementations, some or all of the process of FIG. 6 may be performed by another device or a group of devices separate from user device 110 and/or including user device 110.

The process of FIG. 6 may include receiving a circuit selection (block 610). For example, a user may select a circuit using command builder application 301. A list of network elements may be obtained that is associated with the selected network element (block 620) and command information, relating to network elements included in the obtained list of network elements, may be obtained (block 630). For example, command builder application 301 may send a request to command system 130 for information relating to the circuit. Command system 130 may request information relating to the circuit from circuit management system 150 and circuit management may provide the requested information to command system 130. The information may include a list of network elements associated with the circuit, wherein information about each network element includes a TID associated with the network element, a network element type associated with the network element, a list of AIDs and AID types associated with the network element, and/or other information relating to the network element. Command system 130 may determine a list of commands for each network element type included in the circuit and may send the circuit information, along with the determined lists of commands, to user device 110. User device 110 may generate a circuit record 401 for the selected circuit, may store the received information in the generated circuit record 401, and may use the stored information to perform auto-completion processes in connection with a user building commands for network elements associated with the selected circuit.

A list of network elements may be provided in a user interface (block 640). For example, command builder application 301 may provide the list of network elements associated with the circuit in a user interface generated by command builder application 301. The user may be provided with a menu that lists the TIDs of the network elements associated with the circuit. Additionally or alternatively, the user may be provided with a menu that lists the network element types associated with the circuit.

A selection of a network element may be received (block 650). For example, the user may select a TID and/or a network element type for which a command is to be generated. Auto-completion of a command name may be performed (block 660). An auto-completion process is described below with reference to FIG. 7. For example, in response to selecting a TID and/or a network element type, a list of available commands may be presented to the user based on information stored in command records 470 associated with a selected network element type. The user may select a command name from the list or may start typing a command name. If the user starts typing a command name, the list of displayed command names may be reduced based on the entered keystrokes. If command builder application 301 determines that a command name, or part of a command name, can be uniquely determined by the keystrokes entered by the user, command builder application 301 may replace or complete the user's input with the uniquely determined command name, or part of a command name.

Command names may be segmented and individual command segments may be treated by command builder application 301 as separate, match-able entities. For example, TL1 commands may be segmented with a "-" delimiter that separates individual command segments. As an example, the first command segment may define an action to be taken (e.g., "RTRV" to retrieve, "ACT" to activate, "ENT" to enter, "ED" to edit, "DEL" to delete, etc.), the second command segment may define an object of the action (e.g., "COND" for conditions, "CRS" for cross-connect, etc.), and additional command segments may define qualifiers for the actions or objects. Auto-completion of a command name may include auto-completion of the individual command name segments.

The user may at any point stop entering keystrokes and select a command name from the list of displayed command names. Once a command name has been completed, command builder application 301 may append a delimiter and may start an auto-completion process for a next field associated with the command name. For example, the next field may correspond to a target identifier.

Command builder application 301 may check to make sure that the user has the required permission level to execute the command. For example, command builder application 301 may access command permission level field 490 in command record 470 of the selected command name and may compare the permission level of the command with the user's permission level. If the permission level of the command is higher than the user's permission level, the user may be informed that the user is not permitted to execute the selected command and may be requested to select a different command to execute.

Auto-completion of a target identifier may be performed (block 670). As mentioned above, an auto-completion process is described below with reference to FIG. 7. For example, a list of available TIDs may be presented to the user. The user may select a TID and or may start typing out alphanumeric characters associated with a TID. If the user starts typing a TID, the list of displayed TIDs may be reduced after each key based on the entered keystrokes. If command builder application 301 determines that a TID can be uniquely determined by the keystrokes entered by the user, command builder application 301 may replace the user's input with the uniquely determined TID. The user may at any point stop entering keys and select a TID from the list of displayed TIDs. Once a TID has been completed, command builder application 301 may append a delimiter and may start an auto-completion process for a next field associated with the command name. For example, the next field may correspond to an AID.

Auto-completion of an access identifier may be performed (block 680). As mentioned above, an auto-completion process is described below with reference to FIG. 7. For example, a list of available AIDs may be presented to the user. The user may select an AID and/or may start typing out an AID. If the user starts typing alphanumeric characters associated with an AID, the list of displayed AIDs may be reduced after each key based on the entered keys. If command builder application 301 determines that an AID can be uniquely determined by the keystrokes entered by the user, command builder application 301 may replace the user's input with the uniquely determined AID. The user may at any point stop entering keystrokes and select an AID from the list of displayed AIDs. Once an AID has been completed, command builder application 301 may append a delimiter and may start an auto-completion process for a next field associated with the command name. Some commands may not require an AID identifier and thus auto-completion of an AID identifier may not be performed for some commands.

Auto-completion for other command fields may be performed (block 690). For example, command builder application 301 may perform an auto-completion process with respect to any other fields required for the selected command. A completed command may be submitted for execution (block 695). For example, command builder application 301 may submit the completed command to command system 130 (or directly to equipment management system 140) for execution. The command may be, for example, a command to test network element 170, configure network element 170, obtain information from network element 170, etc.

In some implementations, the user may be provided with a warning if the command to be executed is considered highly intrusive. For example, command builder 310 may check warning field 495 in command record 470 associated with the selected command to determine whether there is a warning associated with the command. If a warning is stored in warning field 495, command building application 301 may present the user with a warning, along with a request to confirm that the user wants to execute the command, before the command is executed.

The executed command may be displayed in the user interface associated with command builder application 301. The user may highlight the selected command and may select to re-execute the command. Furthermore, results associated with an executed command may be displayed in the user interface. For example, if the executed command requests particular information (e.g., port statistics) from network element 170, the particular information may be displayed in the user interface in association with the executed command.

In some implementations, the user need not specify a circuit. For example, a user may select a network element type and an auto-completion process may be performed based on a list of commands associated with the selected network element type. Since no circuit has been selected, auto-completion of a TID may not be available and the user may need to type in the TID once the command name has been auto-completed. When working without a circuit record and when an AID is required for the selected command, the user may need to type in the AID. Additionally or alternatively, a user may enter values by cutting a value (e.g., a TID value or an AID value) from another window and pasting the text into the command data entry field to complete entry of a section of a command. After the text is pasted, the user may need to enter a delimiter character (e.g., a ":" character in TL1) to signal that the command field section is complete. Command builder 310 may respond to the delimiter character being entered by evaluating the command's syntax information to determine what additional user entry, if any, is required to complete the command.

Figure 7:
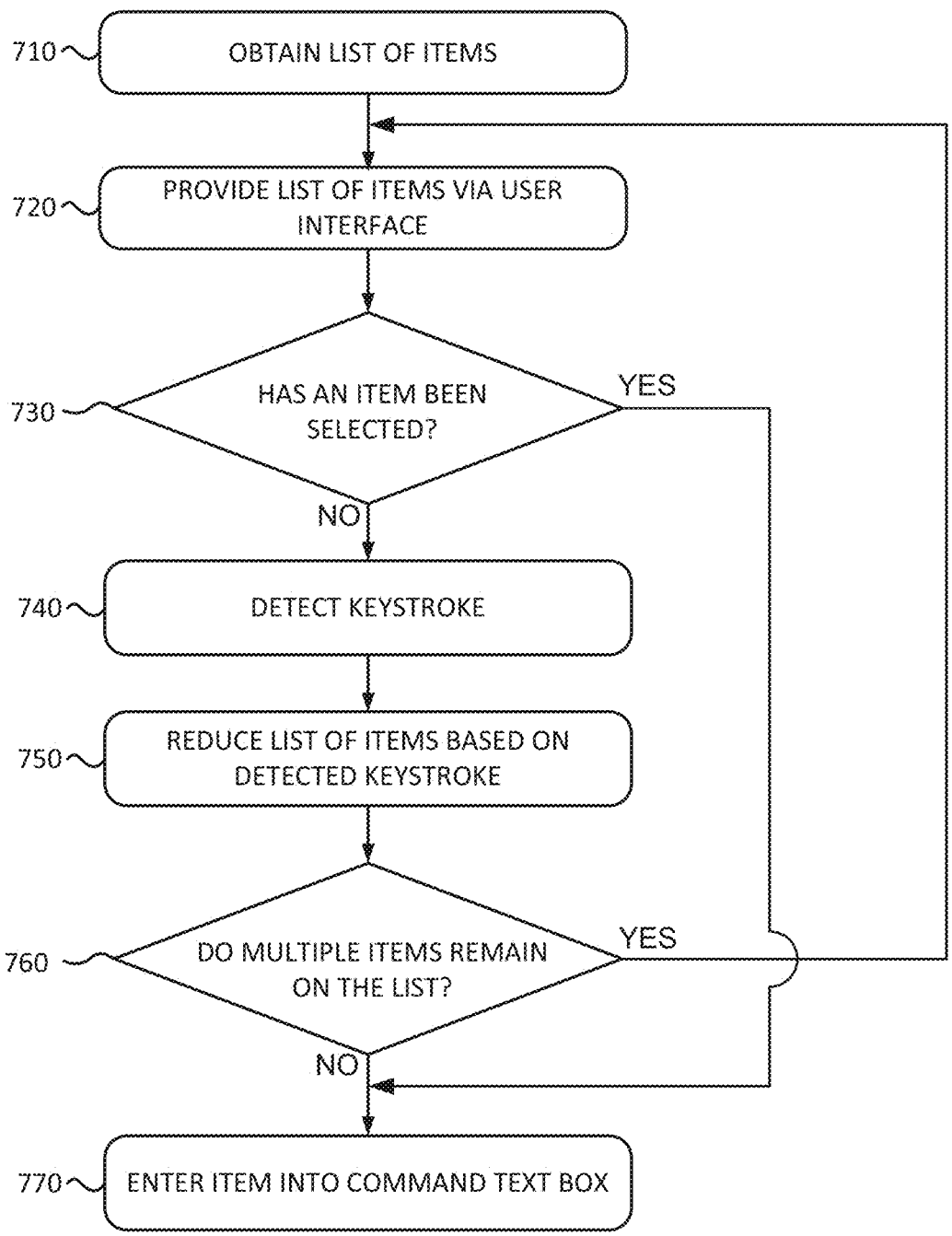
FIG. 7 is a flow chart of an exemplary process for auto-completing an item in a command according to an implementation described herein.

FIG. 7 is a flow chart of an exemplary process for auto-completing an item in a command according to an implementation described herein. The item to be auto-completed may correspond to a command name, part of a command name, a command name segment, or a field associated with a command, such as TID, AID, another identifier, and/or another type of command field. In one implementation, the process of FIG. 7 may be performed by user device 110. In other implementations, some or all of the process of FIG. 7 may be performed by another device or a group of devices separate from user device 110 and/or including user device 110.

The process of FIG. 7 may include obtaining a list of items (block 710). For example, command builder application 301 may determine a list of items for a command name, command name segments, a part of a command name, or a field associated with a command name, based on information stored in command records 470 associated with a selected network element type. The list of items may be retrieved, for example, from circuit record 401. The list of items may be provided via a graphical user interface (block 720). For example, command builder application 301 may display a drop-down menu that includes the list of retrieved items. A user may select an item from the menu or may enter one or more keys into a command text box.

A determination may be made as to whether an item has been selected (block 730). For example, command builder application 301 may determine whether the user has selected an item from the provided list of items. If it is determined that the user has selected an item from the list of items (block 730—YES), the selected item may be entered into the command text box (block 770). For example, command builder application 301 may replace any information entered by the user in connection with the item with the selected item from the list. If it is determined that the user has not selected an item from the list of items (block 730—NO), processing may continue with awaiting further user input.

A key stroke may be detected (block 740) and the list of items may be reduced based on the detected keystroke (block 750). For example, a user may enter a key in the process of specifying an item. In response to detecting the keystroke, the list of items may be reduced to match the entered keystroke. For example, if the user enters the key "R" when typing a command name, a list of commands may be reduced to only include commands that begin with the letter R.

A determination may be made as to whether multiple items remain on the list (block 760). For example, command builder application 301 may determine whether multiple items remain on the list after the list has been reduced based on the detected keystroke. If it is determined that multiple items remain on the list (block 760—YES), processing may return to block 720 to provide the list of items to the user. If it is determined that multiple items do not remain on the list (block 760—NO), the list has been reduced to a single item and the item may be automatically entered into the command text box (block 770). For example, command builder application 301 may replace the information entered by the user in connection with the item with the remaining item from the list.

Figure 8A:
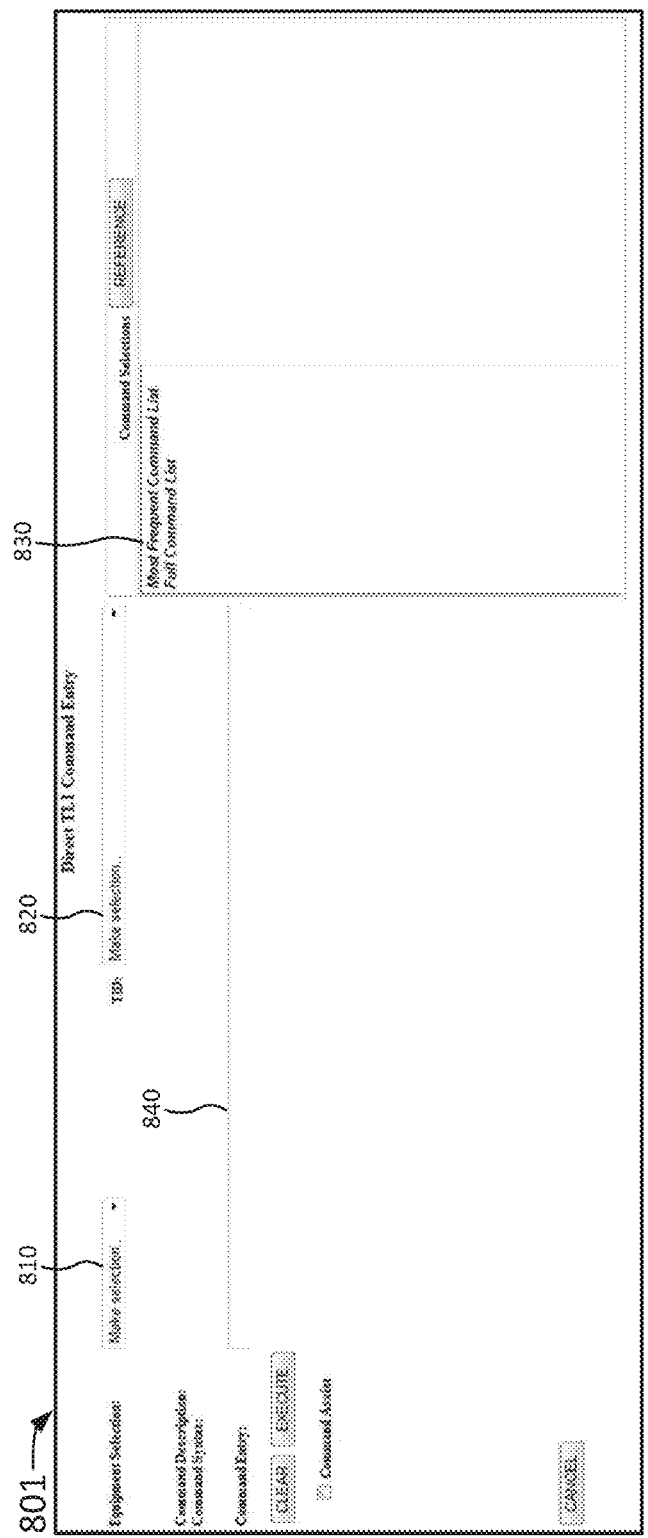

FIGS. 8A-8M are diagrams of a user interface 801 illustrating a first example of command building and execution, using TL1 commands, according to an implementation described herein. As shown in FIG. 8A, user interface 801 may include an equipment selection menu 810, a TID selection menu 820, a command selection menu 830, and a command text box 840. Equipment selection menu 810 may enable a user to select a particular network element type from network element types associated with a selected circuit. A command list associated with a selected network element type may appear in command selection menu 830 when a particular network element type is selected. TID selection menu 820 may enable a user to select a particular TID. When a TID is selected, the network element type corresponding to the selected TID may appear in equipment selection menu 810 and a command list associated with the corresponding network element type may appear in command selection menu 830. A user may select a command from command selection menu 830 or may begin typing out a command. Command auto-completion may be performed in command text box 840 as the user is typing, based on the list of commands, associated with a selected network element type, appearing in command selection menu 830.

Figure 8B:
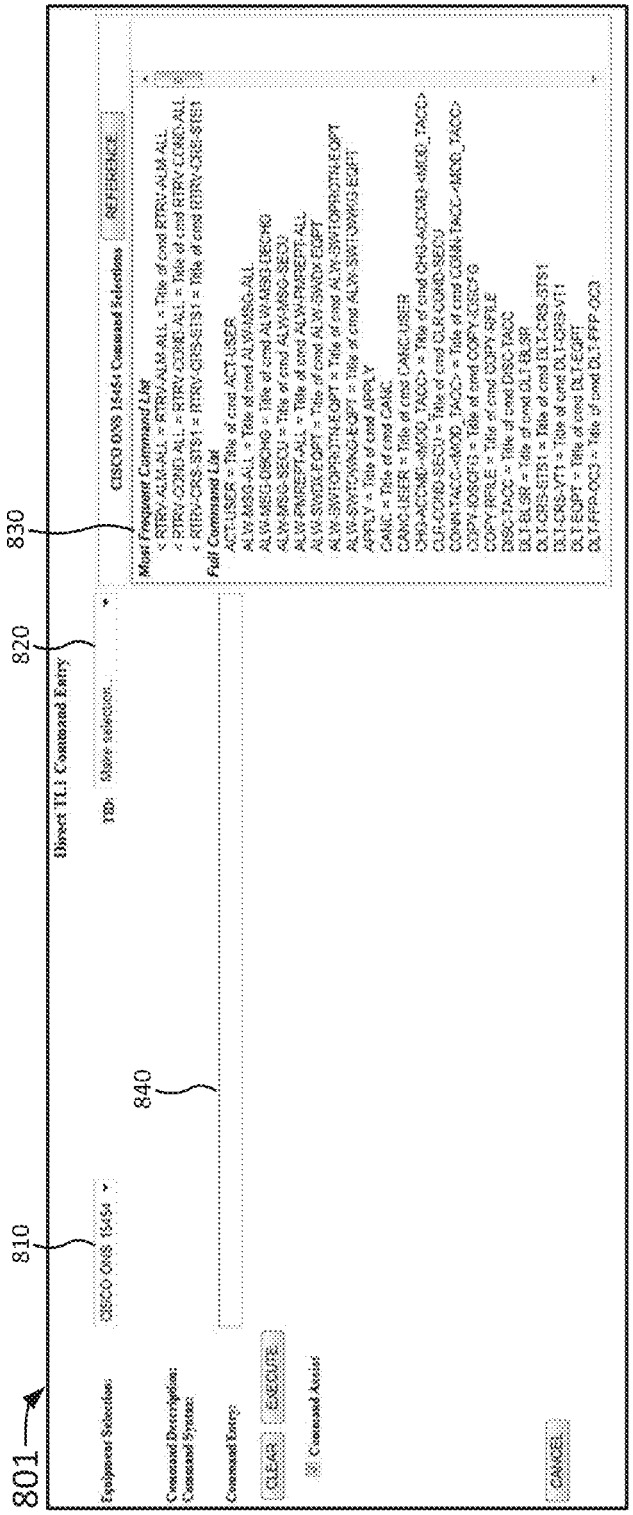
Figure 8C:
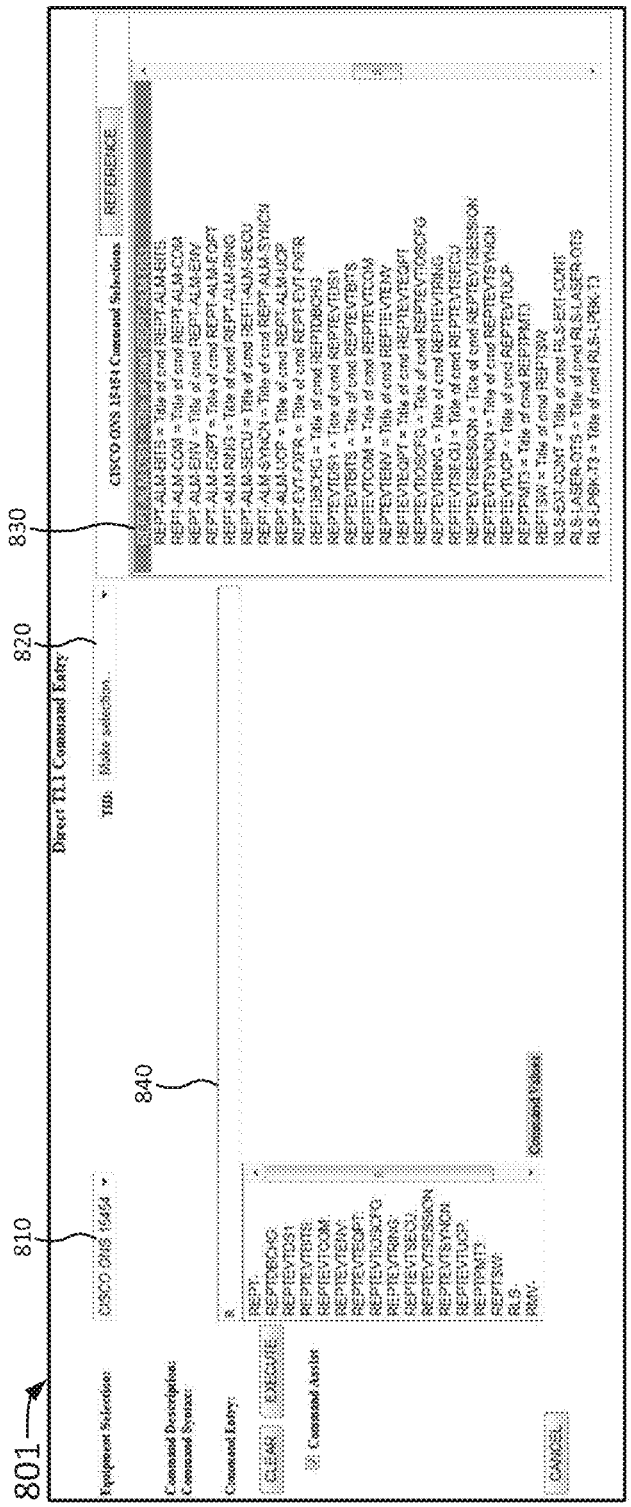

FIG. 8B illustrates user interface 801 after selection of a network element type. As shown in FIG. 8B, equipment selection menu 810 may display the selected network element type of CISCO ONS 15454 and command selection menu 830 may display the available TL1 commands for CISCO ONS 15454 equipment. FIG. 8C illustrates user interface 801 after the user presses the key "R," as shown in keystroke sequence 850 of FIG. 8C. Command text box 840 may be modified to include a selection menu of commands that may correspond to the list of commands from command selection menu 830 reduced based on the entered keystrokes. Since the user entered the key "R," only commands beginning with the letter "R" are included in the reduced list of commands in command text box 840.

Figure 8D:
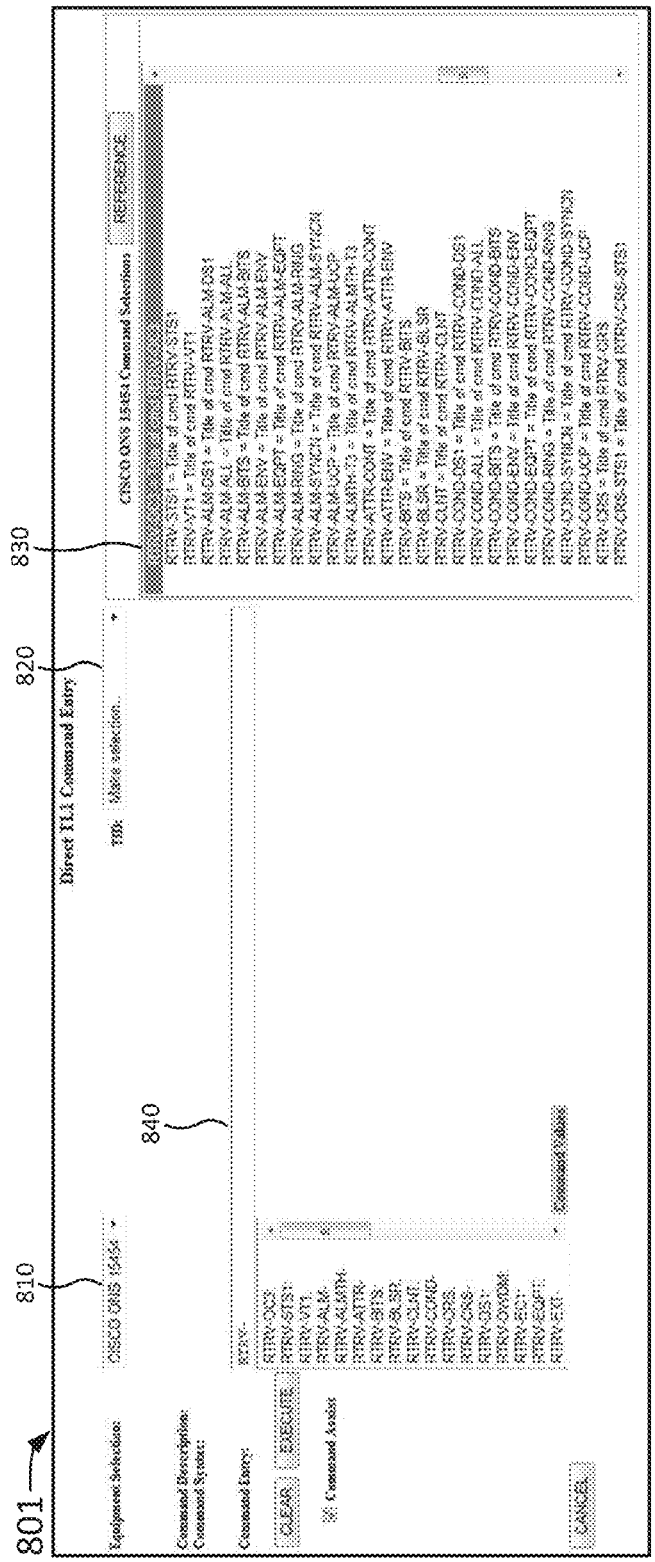
Figure 8E:
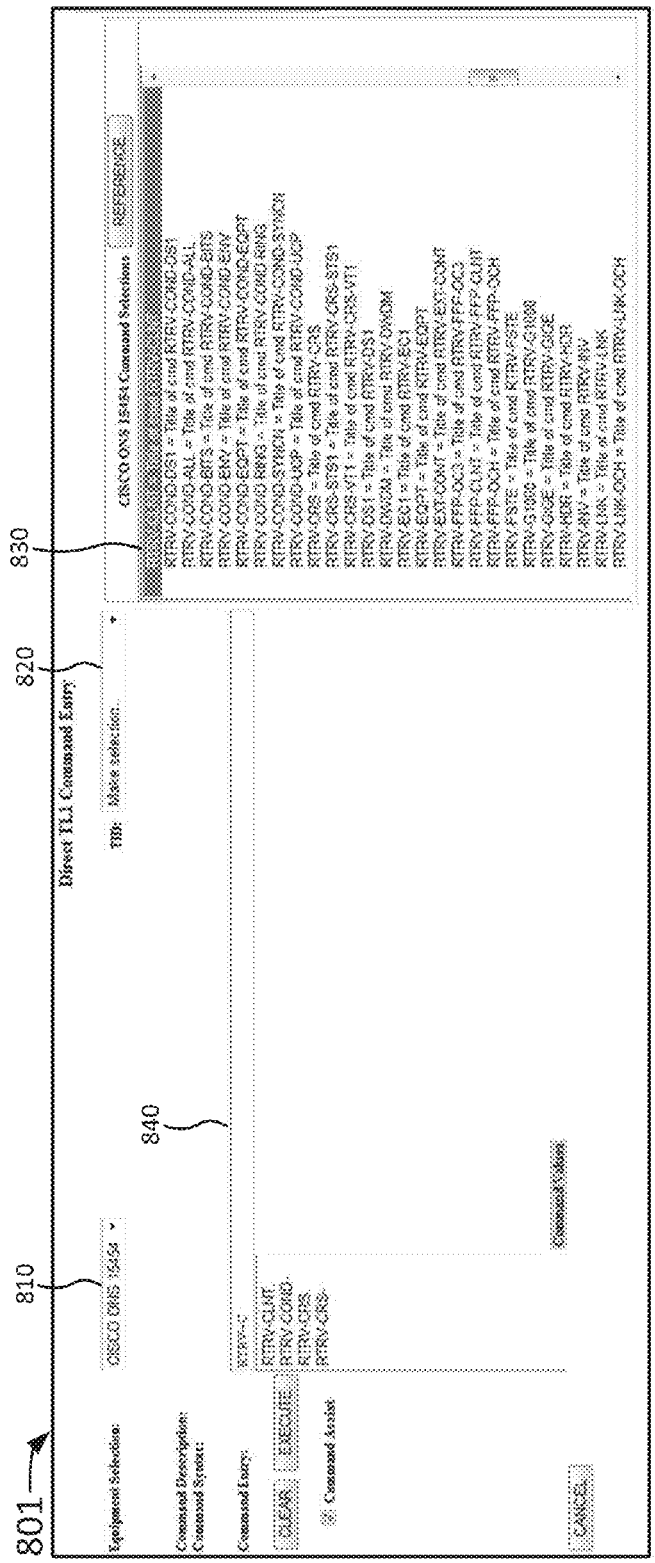
Figure 8F:
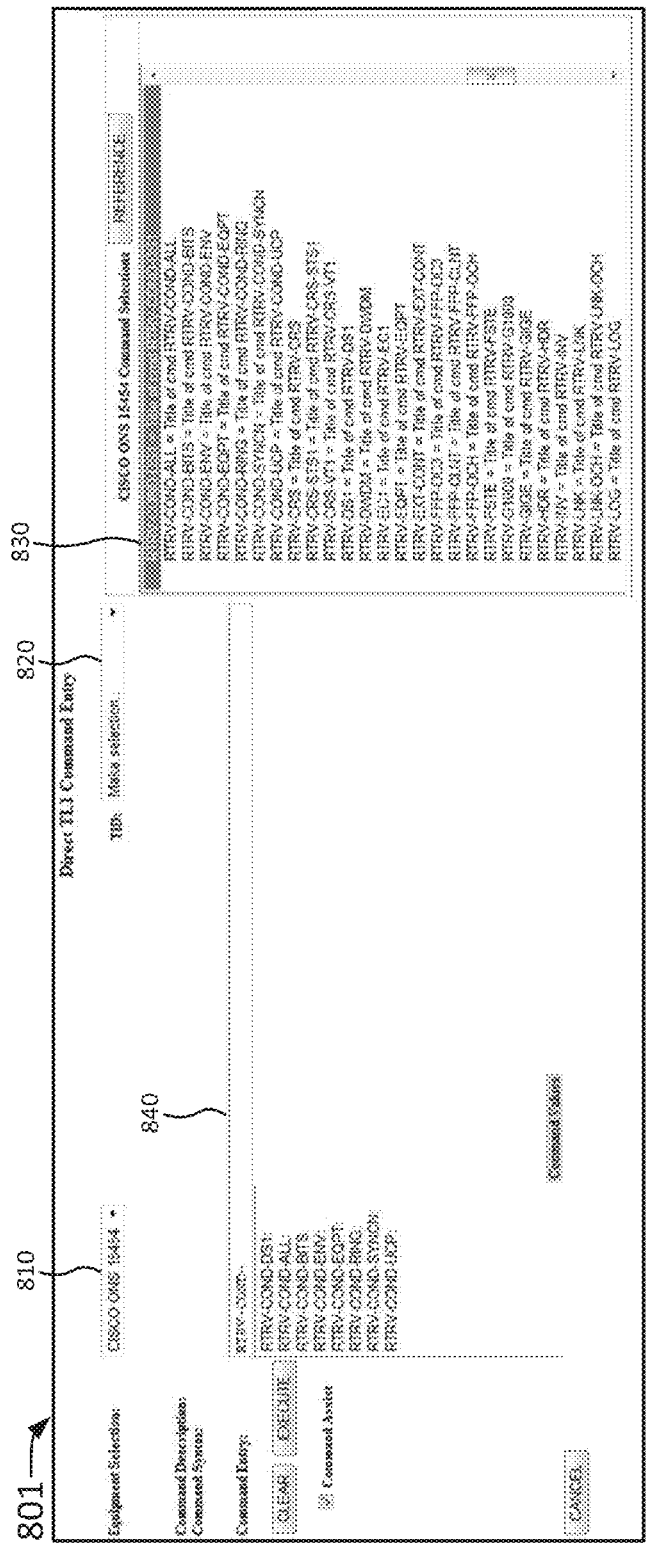

FIG. 8D illustrates user interface 801 after the user presses the key "T," as shown in keystroke sequence 850 of FIG. 8D. Command builder application 301 may recognize the command RTRV, the text in command text box 840 may be completed to include the string "RTRV," and the list of commands shown by command text box 840 may be reduced to only include RTRV commands. FIG. 8E illustrates user interface 801 after the user presses the key "C," as shown in keystroke sequence 850 of FIG. 8E. The list of commands shown by command text box 840 may be reduced so that only RTRV commands beginning with the letter "C" are included. FIG. 8F illustrates user interface 801 after the user presses the key "O," as shown in keystroke sequence 850 of FIG. 8F. Command builder application 301 may recognize the string COND, the text in command text box 840 may be completed to include the string "RTRV-COND," and the list of commands shown by command text box 840 may be reduced to only include RTRV-COND commands.

Figure 8G:
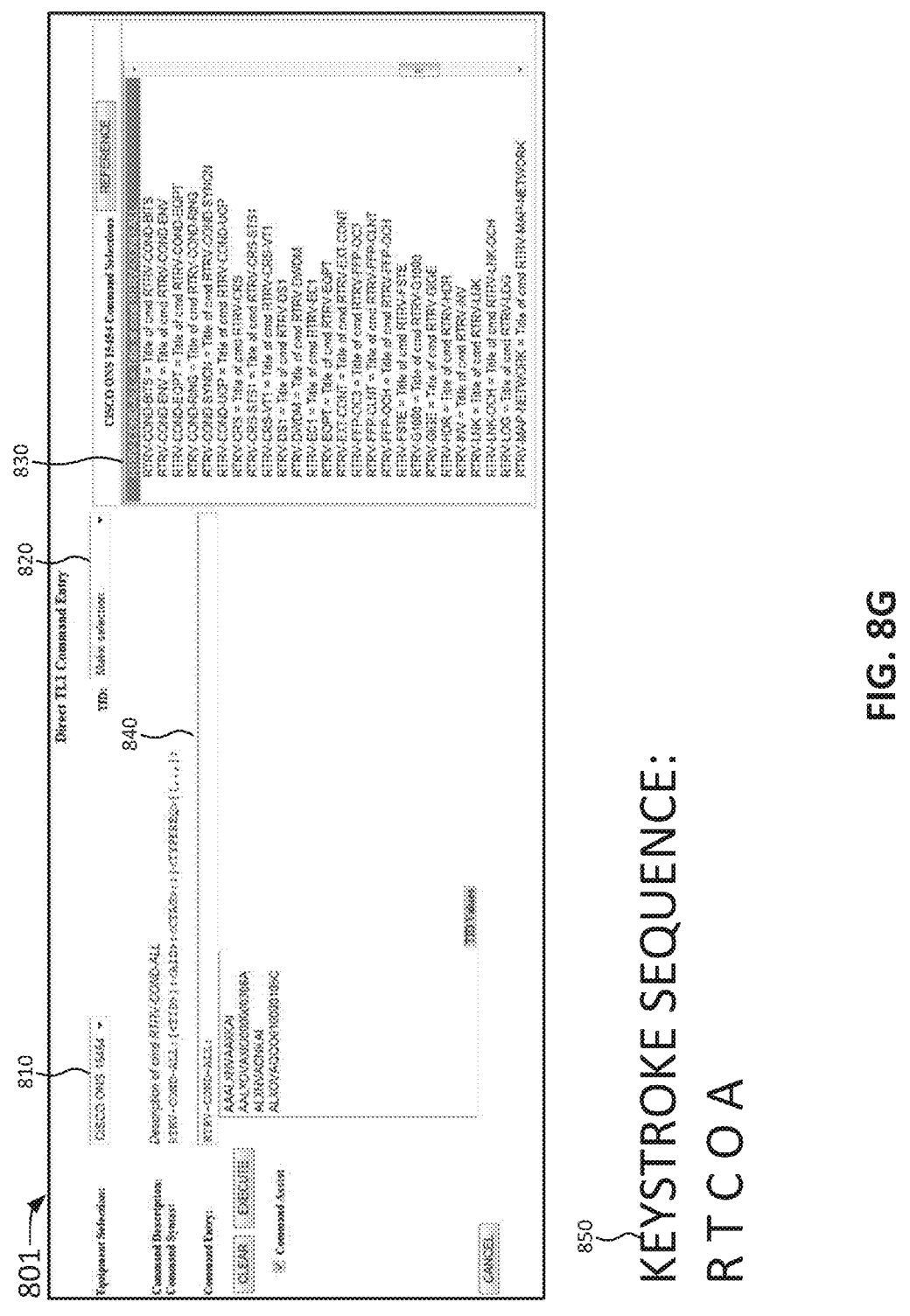

FIG. 8G illustrates user interface 801 after the user presses the key "A," as shown in keystroke sequence 850 of FIG. 8G. Command builder application 301 may recognize the string ALL, the text in command text box 840 may be completed to include the string "RTRV-COND-ALL:" as command builder application 301 may recognize that the command name has been completed and that the delimiter ":" should be appended at the end of the command name.

Furthermore, command builder application 301 may determine that the next field of the command that needs to be specified is the TID and command text box 840 may be modified to include a list of the possible TIDs. The list of possible TIDs may be selected based on the network elements, included in the circuit, which correspond to the selected network element type (e.g., CISCO ONS 15454 in this case).

Figure 8H:
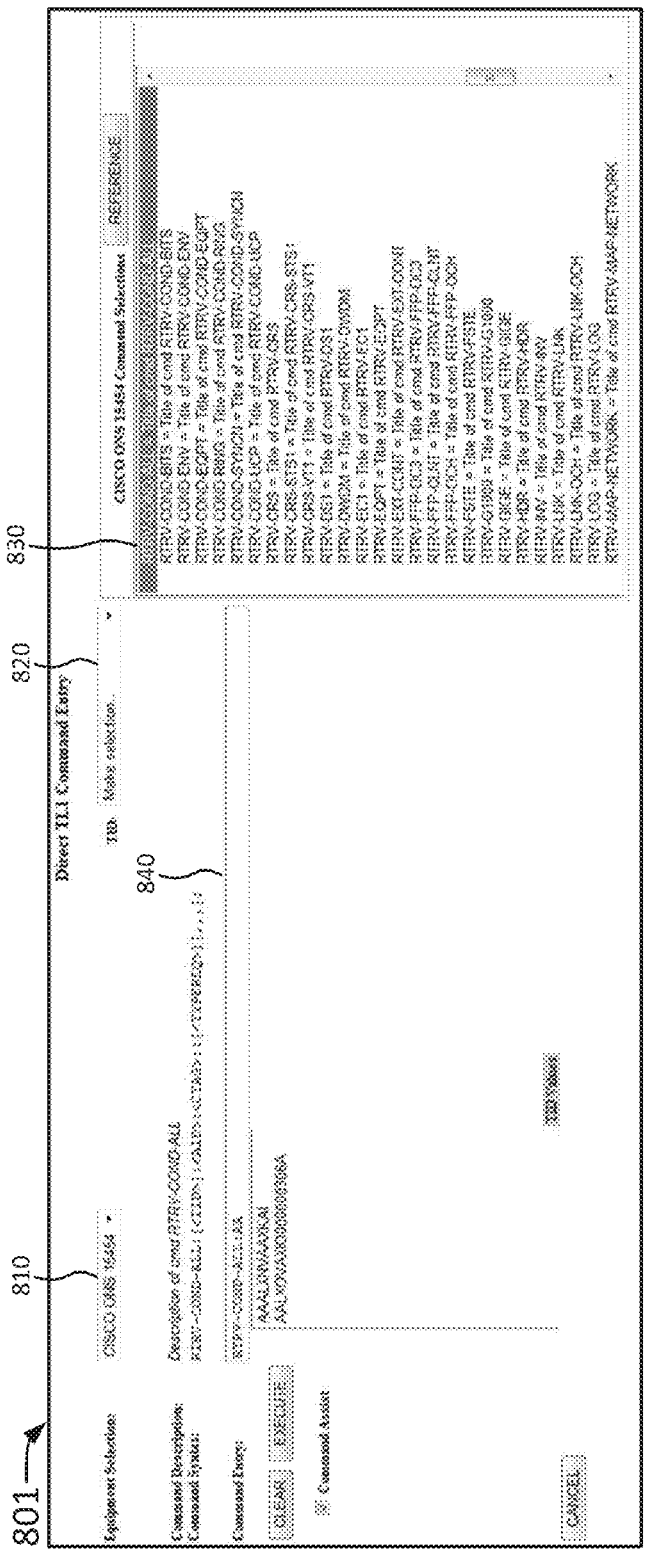
Figure 8I:
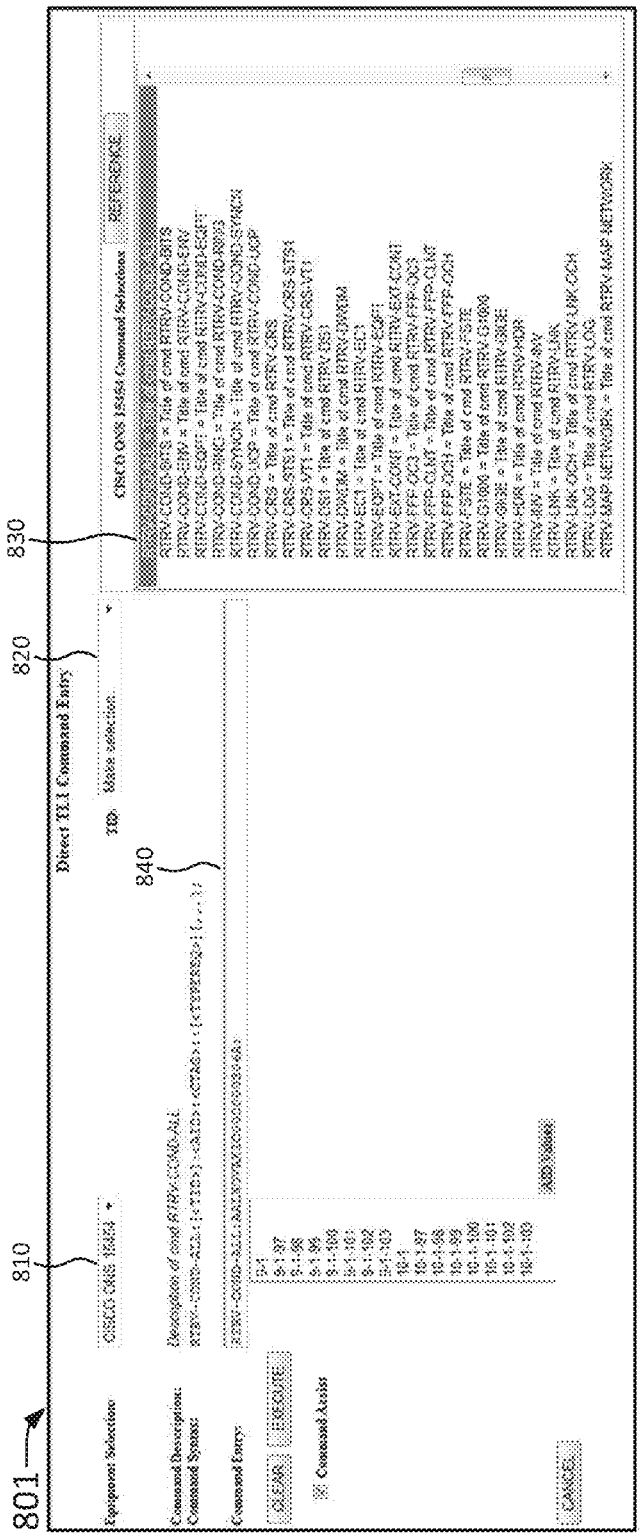

FIG. 8H illustrates user interface 801 after the user presses the key sequence "AA," as shown in keystroke sequence 850 of FIG. 8H. The list of TIDs shown by command text box 840 may be reduced so that only TIDs beginning with the string "AA" are included. FIG. 8I illustrates user interface 801 after the user presses the key "L," as shown in keystroke sequence 850 of FIG. 8I. Command builder application 301 may recognize the TID AALXOVAXIO000000306A, the text in command text box 840 may be completed to include the string "RTRV-COND-ALL: AALXOVAXIO000000306A:" as command builder application 301 may recognize that the TID has been completed and that the delimiter ":" should be appended at the end of the TID. Furthermore, command builder application 301 may determine that the next field of the command that needs to be specified is the AID and command text box 840 may be modified to include a list of the possible AIDs. The list of possible AIDs may be selected based on AIDs associated with the selected TID.

Figure 8J:
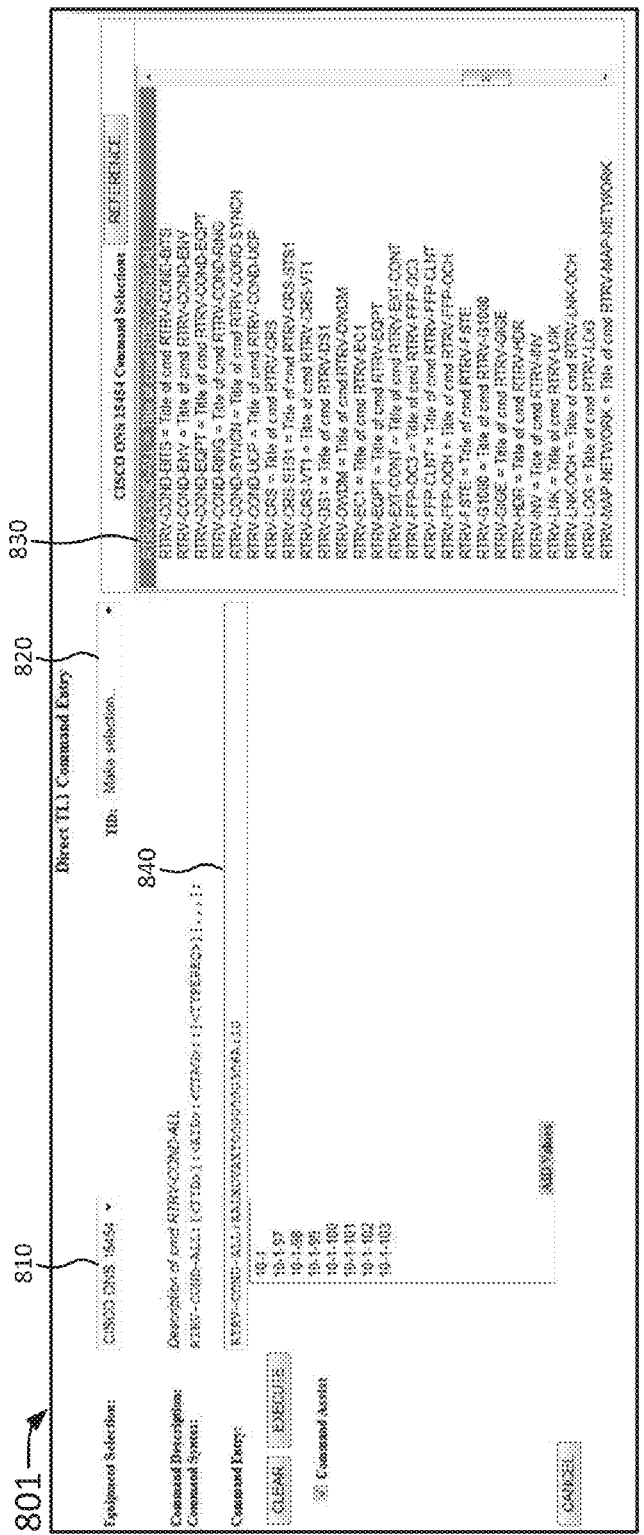
Figure 8K:
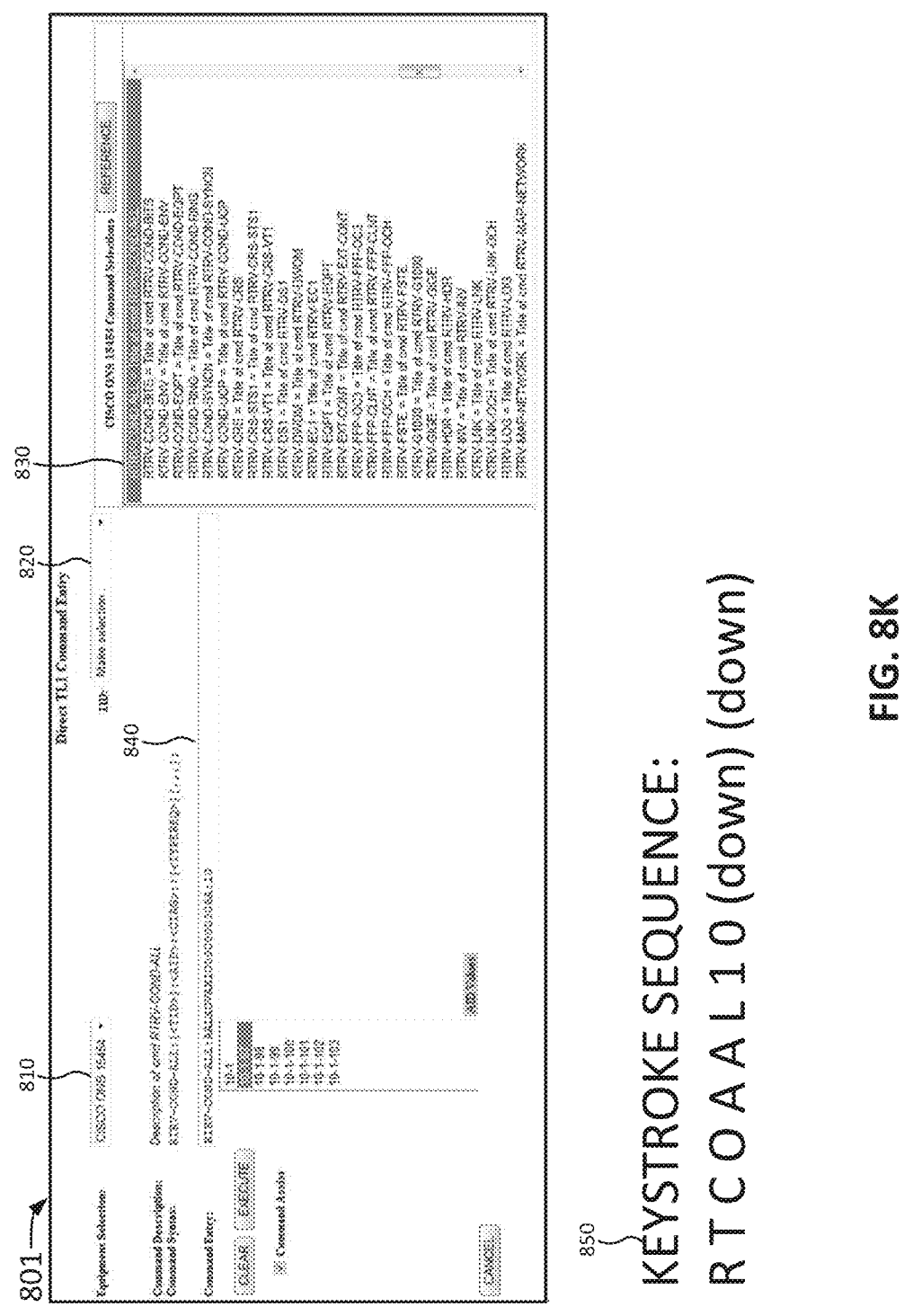

FIG. 8J illustrates user interface 801 after the user presses the keys "10," as shown in keystroke sequence 850 of FIG. 8J. The list of AIDs shown by command text box 840 may be reduced so that only AIDs beginning with the string "10" are included. FIG. 8K illustrates user interface 801 after the user presses the down arrow key twice, as shown in keystroke sequence 850 of FIG. 8K. The second AID in the list associated with command text box 840 may be highlighted.

Figure 8L:
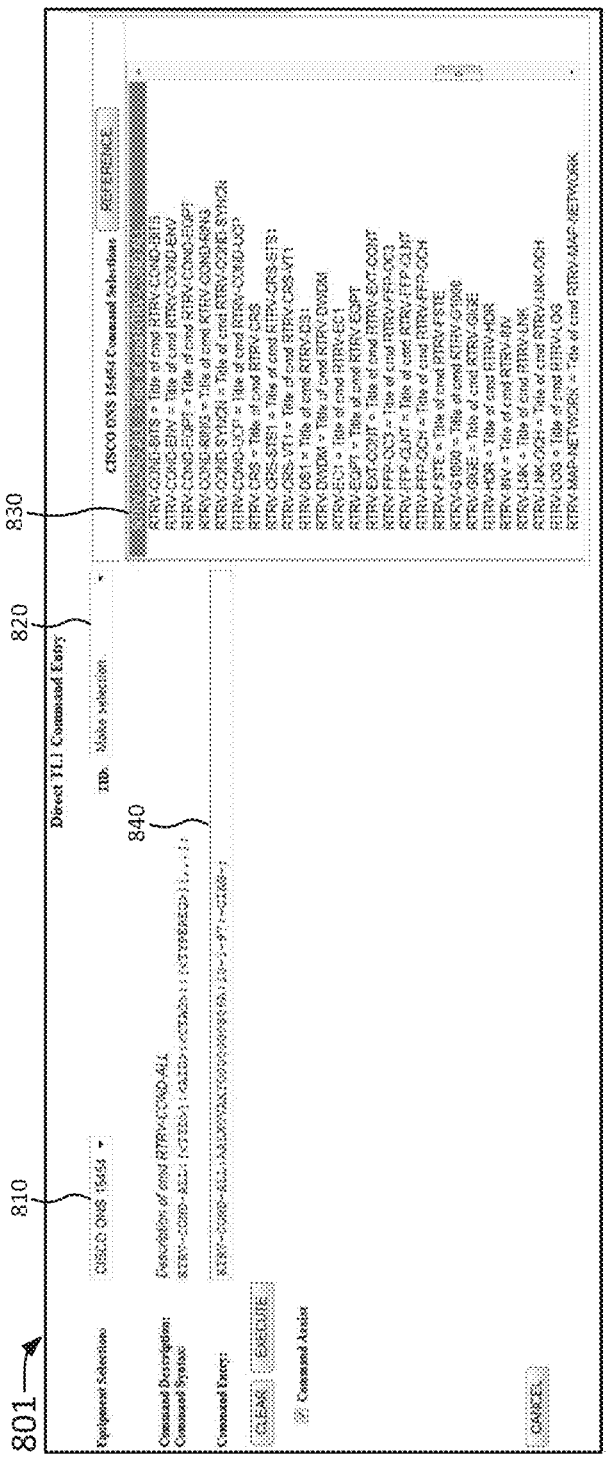

FIG. 8L illustrates user interface 801 after the user presses the enter key, as shown in keystroke sequence 850 of FIG. 8L. In response to detecting the enter key, command builder application 301 may insert the selected AID, namely "10-1-97," into command text box 840. Command builder application 301 may append the ":" delimiter, may determine that no other identifiers are required and may append any remaining command fields.

Figure 8M:
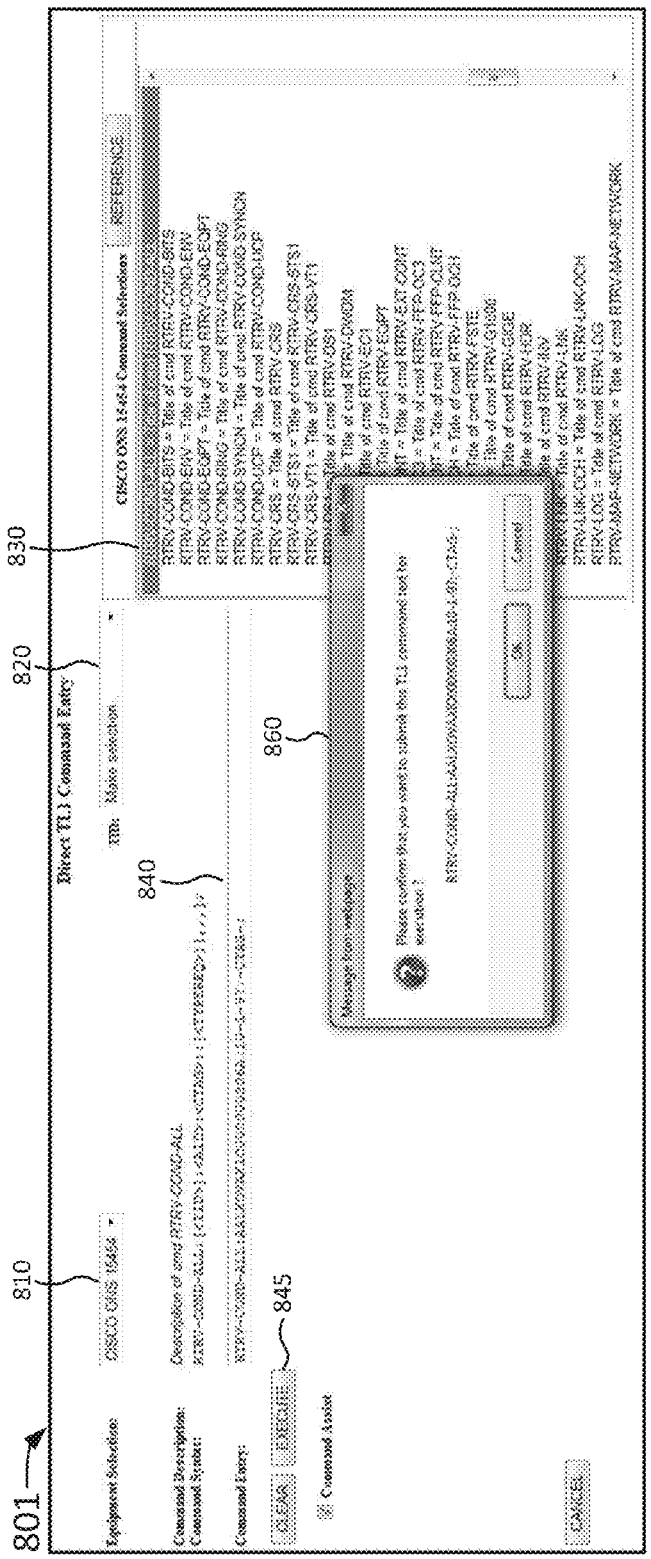

FIG. 8M illustrates user interface 801 after the user presses execute key 845. Command builder application 301 may generate message window 860, asking the user to confirm that the user wants to send the completed command for execution. Once the user confirms, the completed command may be sent to command system 130. Command system 130 may send the completed command to equipment management system 140 for execution. In the example of FIGS. 8A-8M, the number of keystrokes entered by the user may be 12, compared to the 52 keystrokes required to type out the whole command.

Figure 9A:
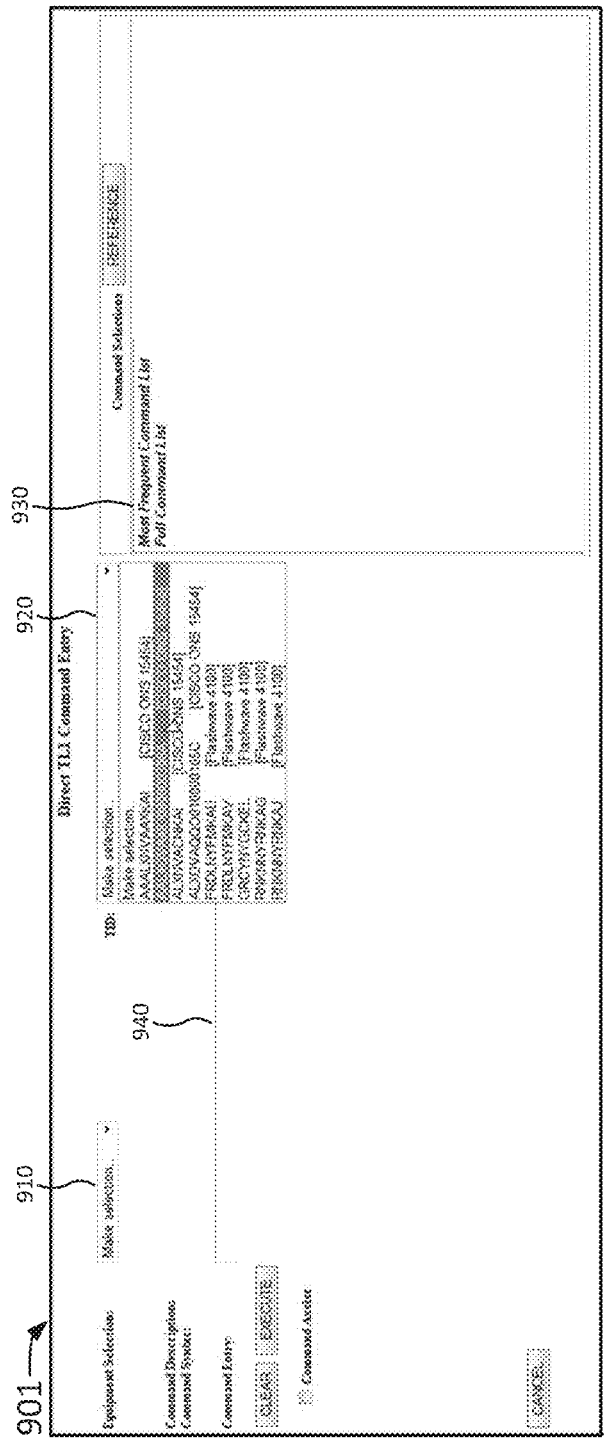
FIGS. 9A-9G are diagrams of user interfaces illustrating a second example of command building and execution according to an implementation described herein.

FIGS. 9A-9G are diagrams of a user interface 901 illustrating a second example of command building and execution, using TL1 commands, according to an implementation described herein. The example of FIGS. 9A-9G shows that a user may select a TID and an AID before beginning to enter a command, thereby saving additional keystrokes. As shown in FIG. 9A, user interface 901 may include an equipment selection menu 910, a TID selection menu 920, a command selection menu 930, and a command text box 940. FIG. 9A illustrates user interface 901 after the user clicks on TID selection menu 920, as shown in keystroke sequence 950 of FIG. 9A. In response, a list of the available TIDs may be displayed in TID selection menu 920.

Figure 9B:
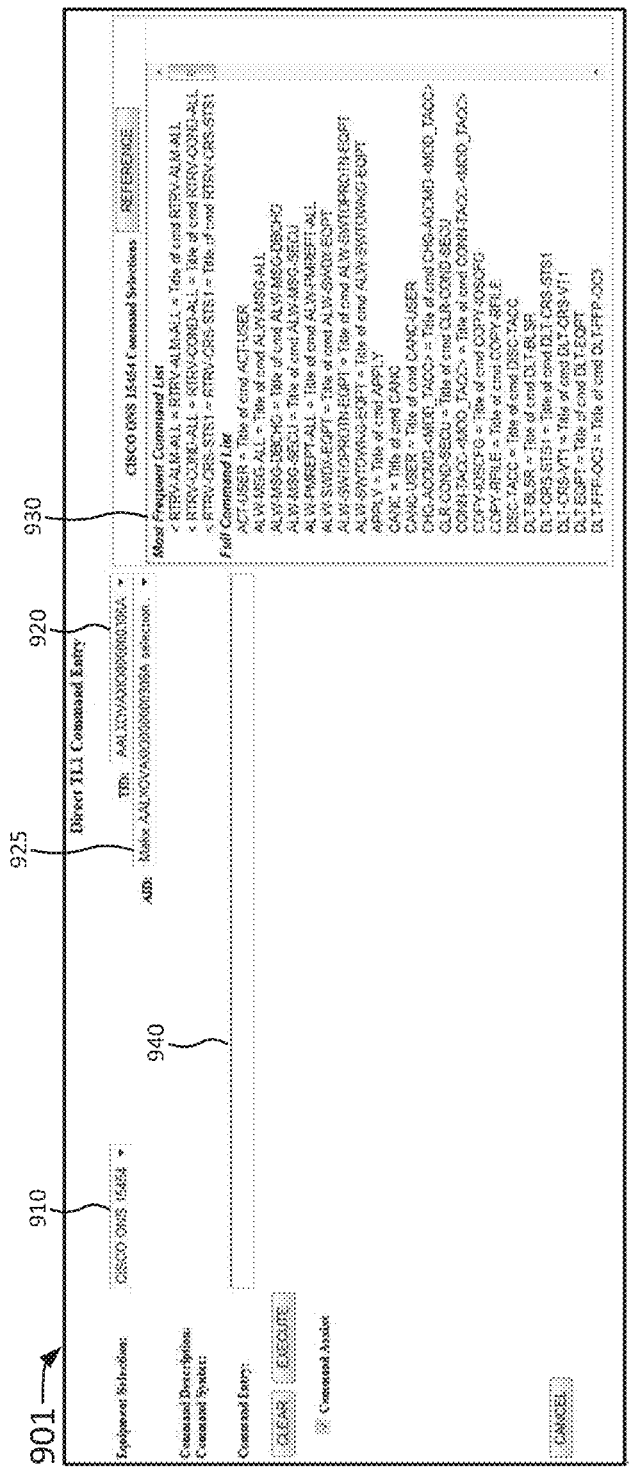
Figure 9C:
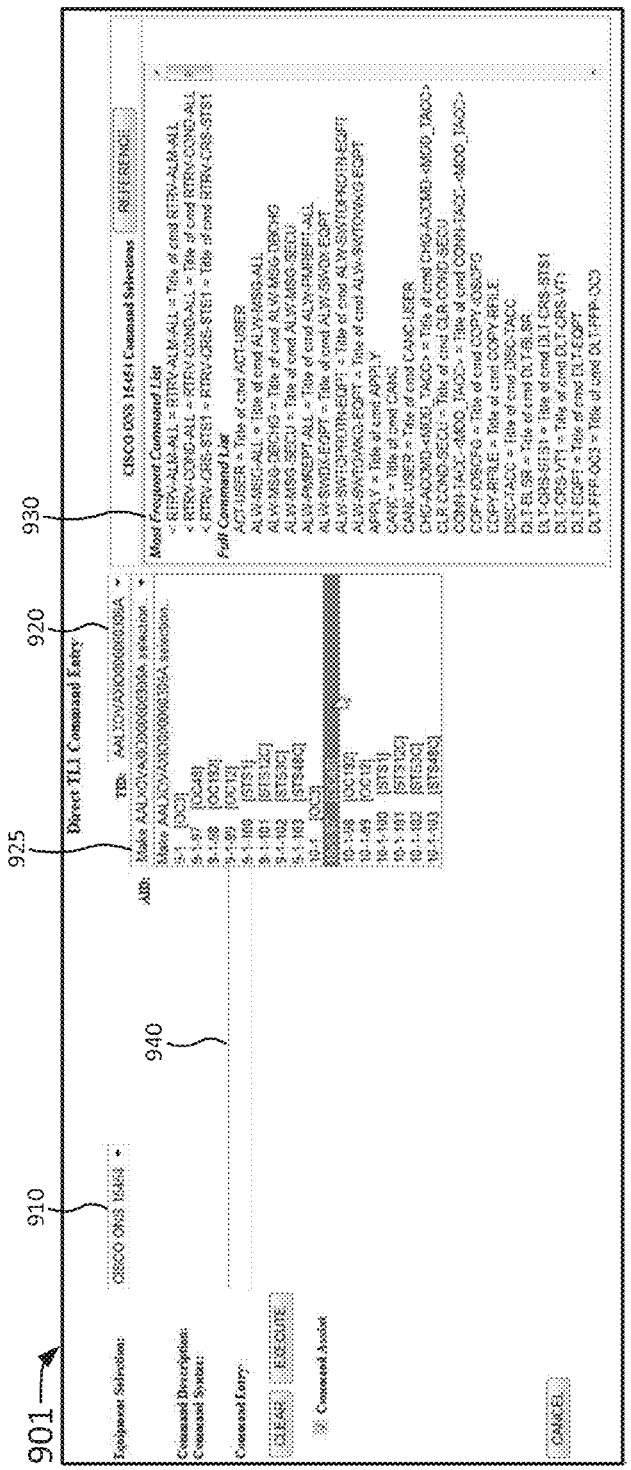

FIG. 9B illustrates user interface 901 after the user selects a TID from TID selection menu 920, as shown in keystroke sequence 950 of FIG. 9B. In response, an AID selection menu 925 may be displayed in user interface 901. FIG. 9C illustrates user interface 901 after the user clicks on AID selection menu 925, as shown in keystroke sequence 950 of FIG. 9C. In response, a list of the available AIDs may be displayed in AID selection menu 925. The list of available AIDs may be based on AIDs associated with the selected TID.

Figure 9D:
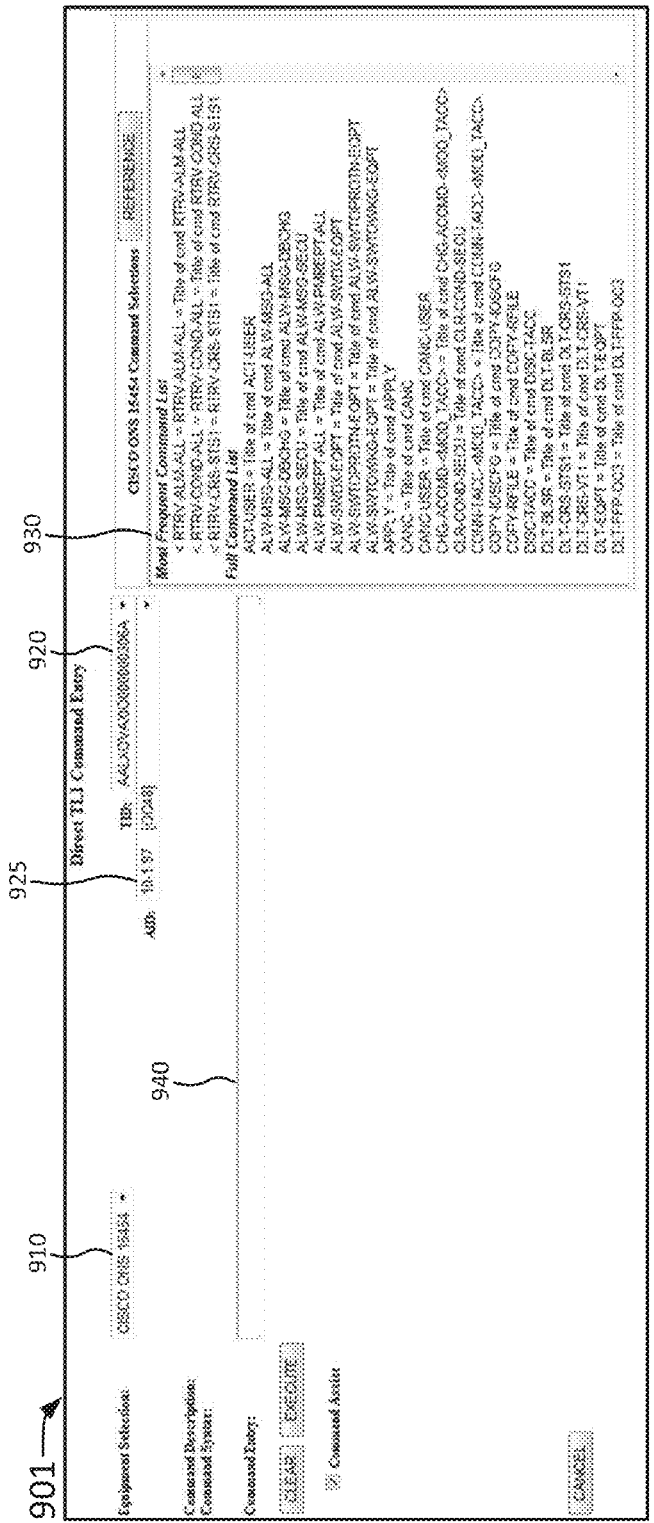
Figure 9E:
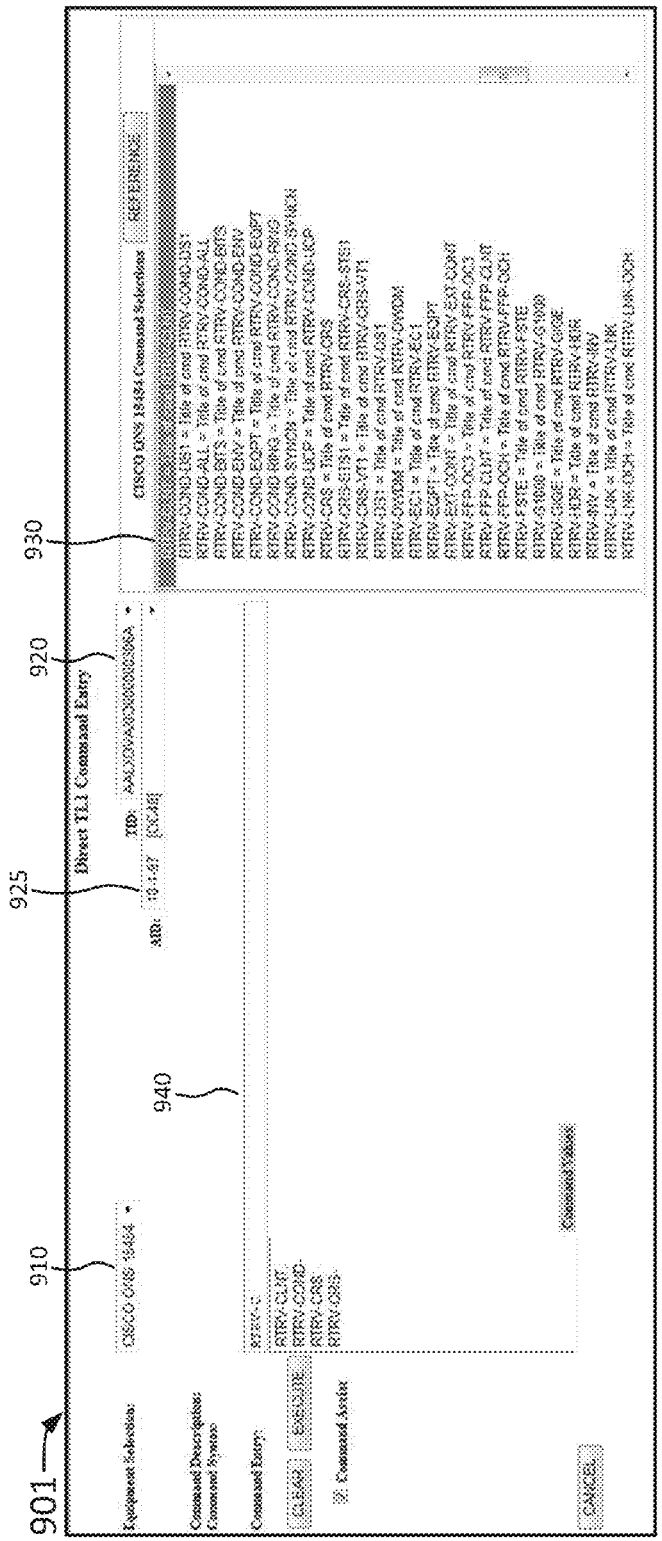
Figure 9F:
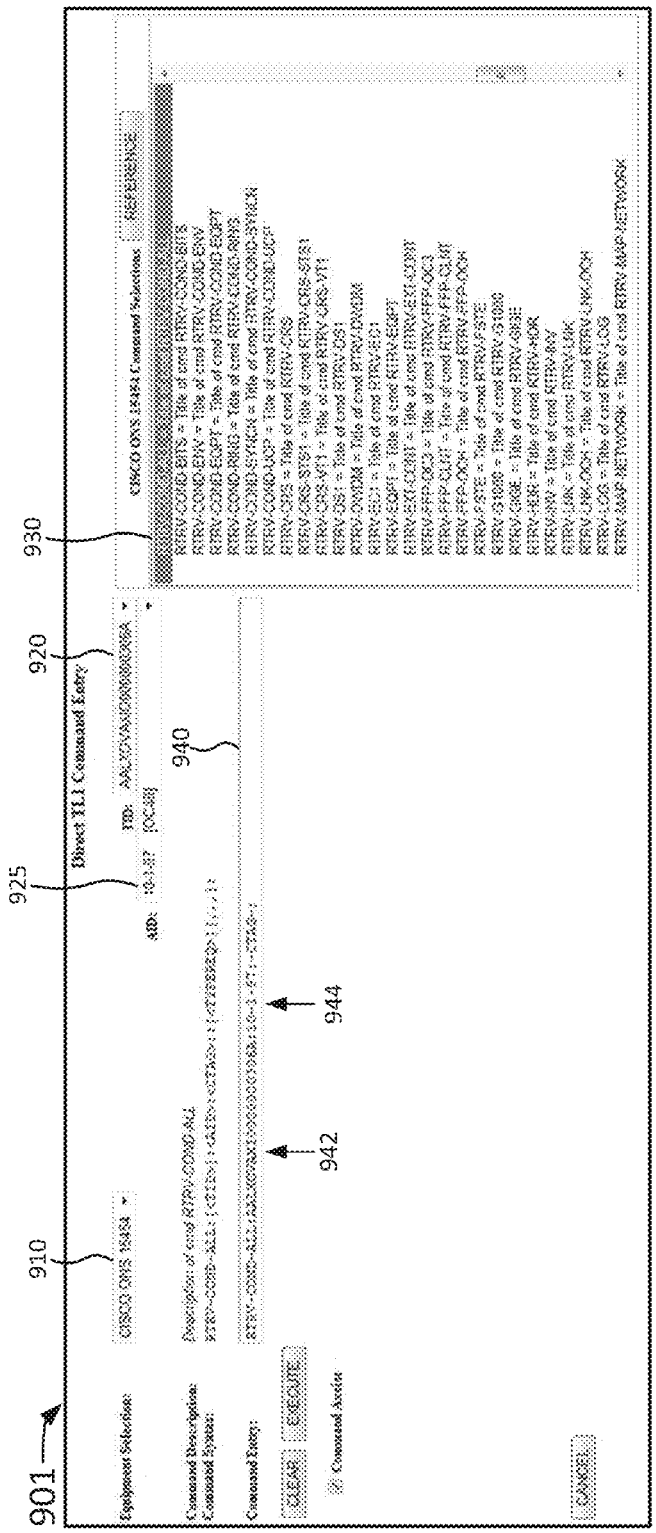

FIG. 9D illustrates user interface 901 after the user selects an AID from AID selection menu 925, as shown in keystroke sequence 950 of FIG. 9D. The user has now selected a TID and an AID for a command to be generated. FIG. 9E illustrates user interface 901 after the user has entered the keystroke sequence "R T C," as shown in keystroke sequence 950 of FIG. 9E. In response, the list of commands shown by command text box 940 may be reduced so that only commands beginning with the string "RTRV-C" are included. FIG. 9F illustrates user interface 901 after the user enters the keys "O" and "A," as shown in keystroke sequence 950 of FIG. 9F. In response, command builder application 301 may identify the command RTRV-COND-ALL, the text in command text box 940 may be completed to include the string "RTRV-COND-ALL:" as command builder application 301 may recognize that the command name has been completed and that the delimiter ":" should be appended at the end of the command name. Furthermore, command builder application 301 may automatically append the selected TID (item 942) from TID selection menu 920, followed by delimiter ":" and may automatically append the selected AID (item 944) from AID selection menu 925, followed by delimiter ":". Furthermore, command builder application 301 may determine that no other identifiers are required and may append any remaining command fields.

Figure 9G:
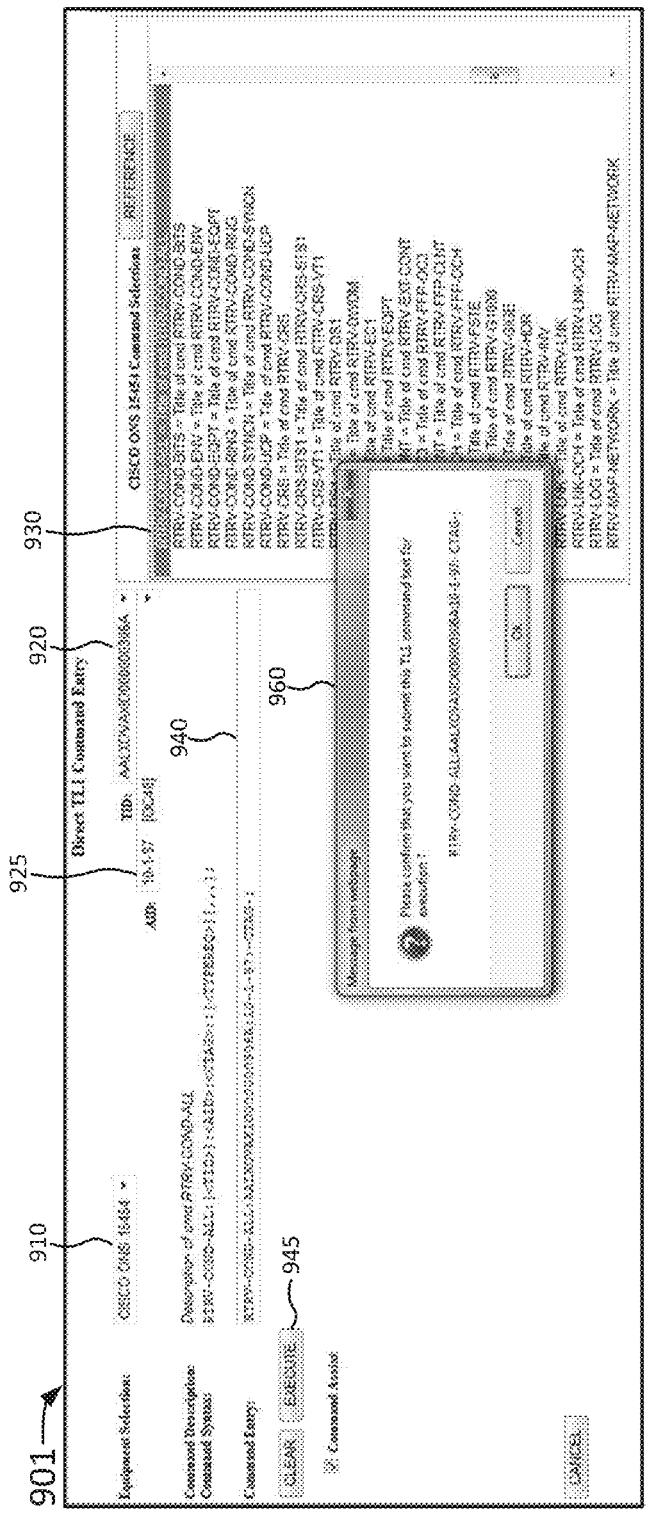

FIG. 9G illustrates user interface 901 after the user presses execute key 945. Command builder application 301 may generate message window 960, asking the user to confirm that the user wants to send the completed command for execution. Once the user confirms, the completed command may be sent to command system 130. Command system 130 may send the completed command to equipment management system 140 for execution. In the example of FIGS. 9A-9G, the number of keystrokes entered by the user may be 6, compared to the 52 keystrokes required to type out the whole command.

Figure 10A:
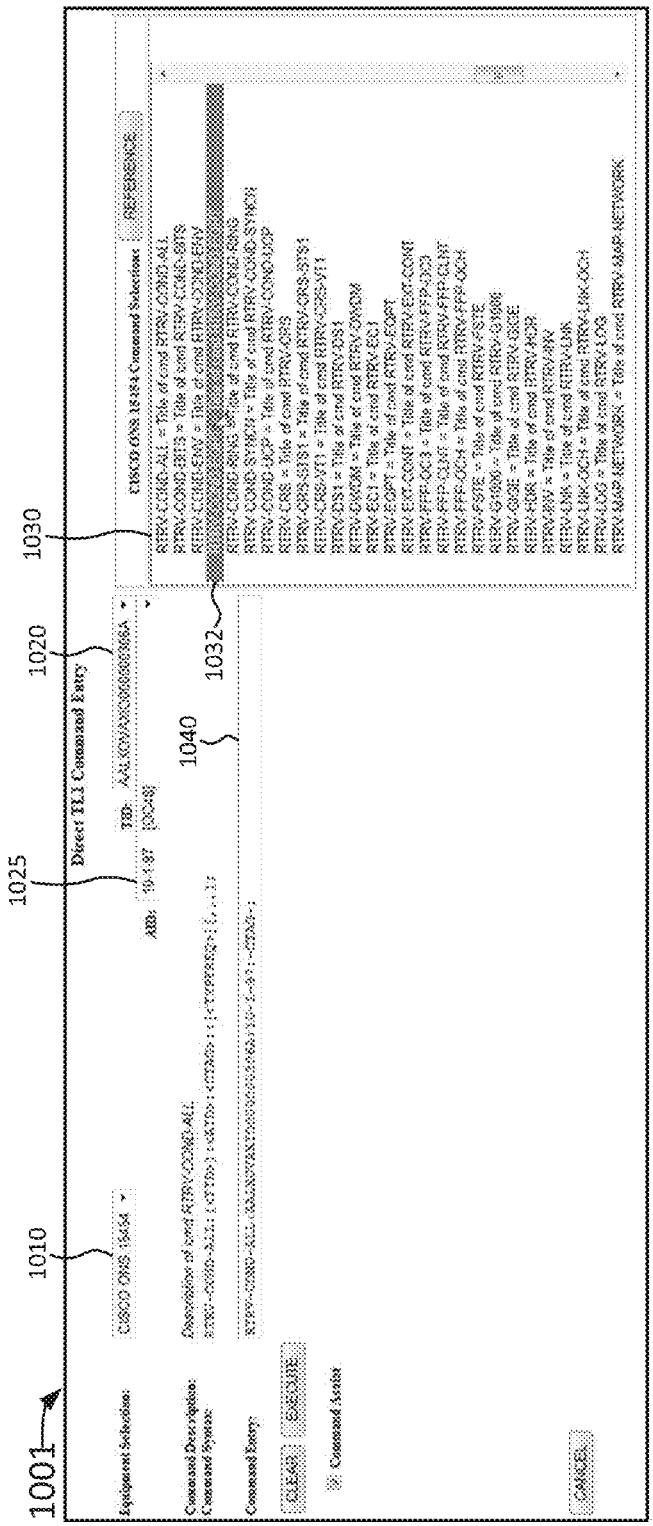
FIGS. 10A-10C are diagrams of user interfaces illustrating a third example of command building and execution according to an implementation described herein.
Figure 10B:
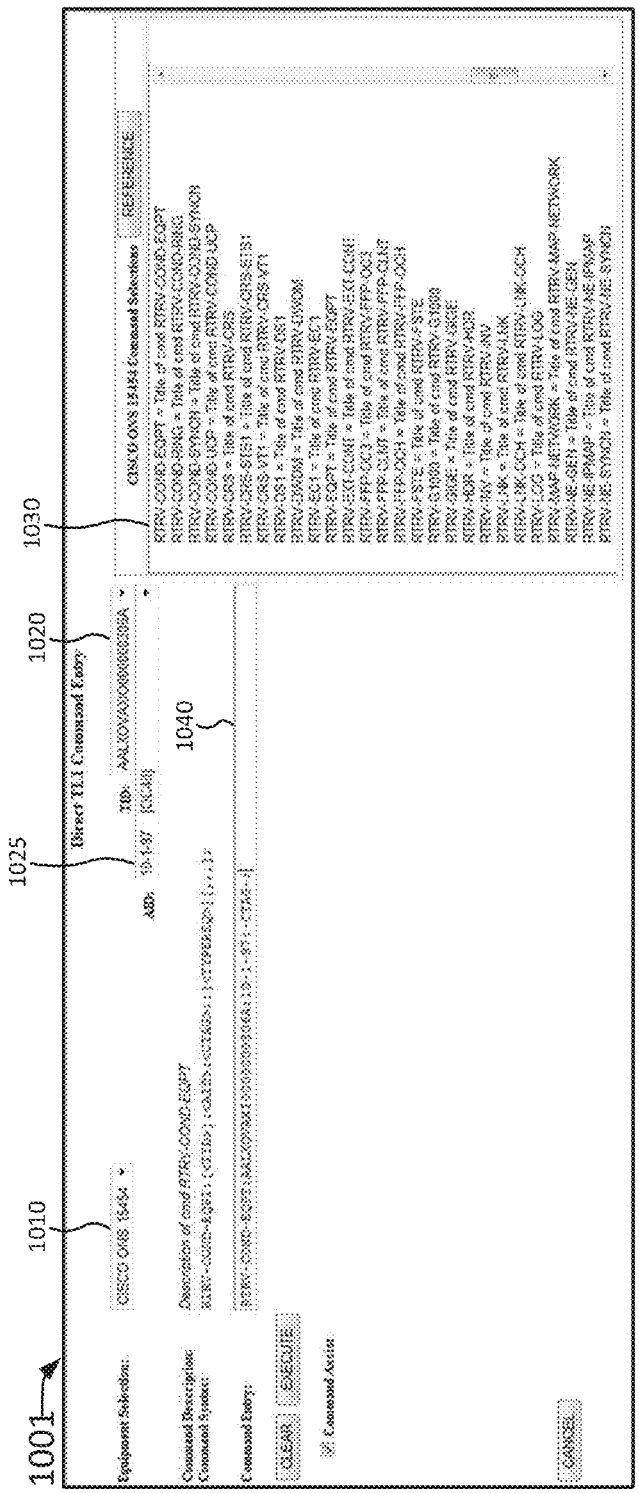
Figure 10C:
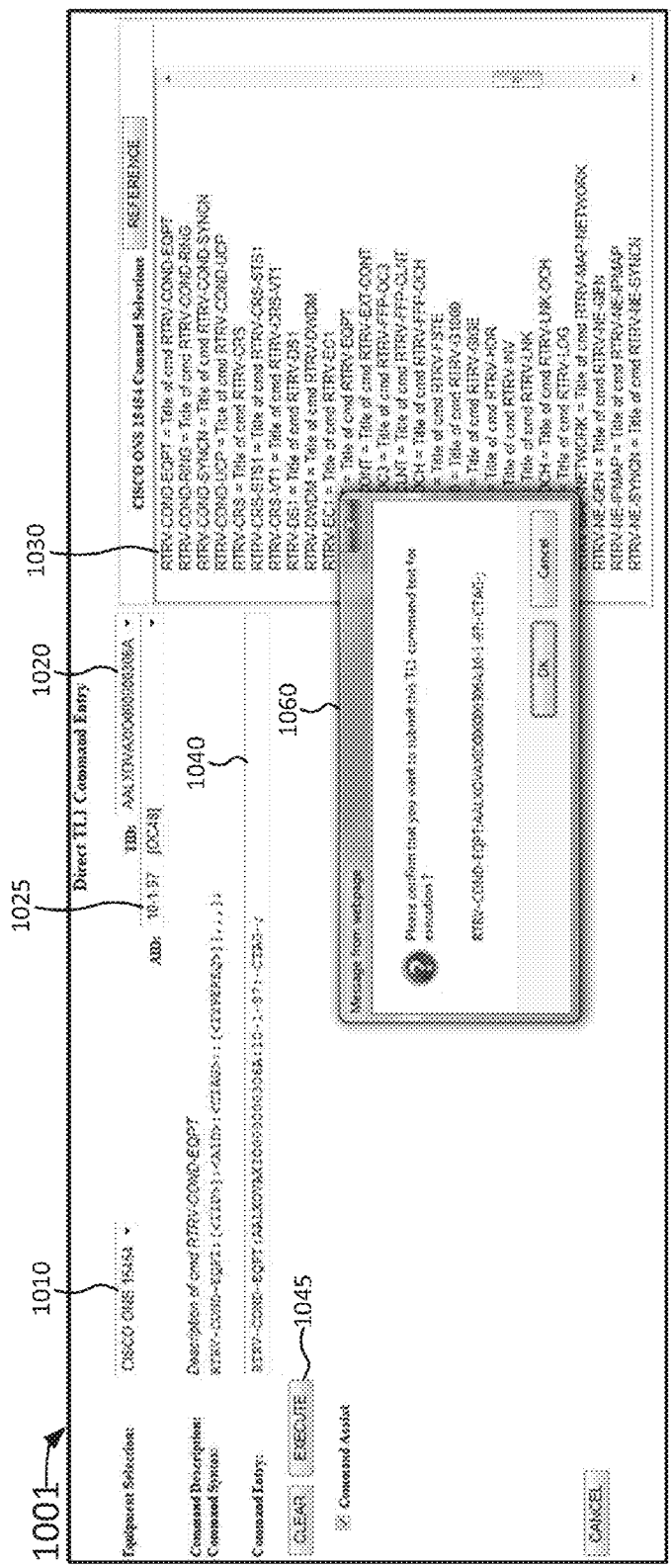

FIGS. 10A-10C are diagrams of a user interface 1001 illustrating a third example of command building and execution, using TL1 commands, according to an implementation described herein. The example of FIGS. 10A-10C shows that a user may select another command while re-using the previously specified TID and AID. As shown in FIG. 10A, user interface 1001 may include an equipment selection menu 1010, a TID selection menu 1020, a command selection menu 1030, and a command text box 1040.

FIG. 10A illustrates user interface 1001 from the last executed command (from FIG. 9G) and after the user highlights another command 1032 from command selection menu 1030, as shown in keystroke sequence 1050 of FIG. 10A. FIG. 10B illustrates user interface 1001 after the user selects command 1032. In response, the command RTRV-COND-ALL from FIG. 9G may be replaced by the selected command RTRV-COND-EQPT, while the previously specified TID and AID strings may remain in command text box 1040.

FIG. 10C illustrates user interface 1001 after the user presses execute key 1045. Command builder application 301 may generate message window 1060, asking the user to confirm that the user wants to send the completed command for execution. Once the user confirms, the completed command may be sent to command system 130. Command system 130 may send the completed command to equipment management system 140 for execution. In the example of FIGS. 10A-10C, the number of keystrokes entered by the user may be 3, compared to the 52 keystrokes required to type out the whole command.

Figure 11A:
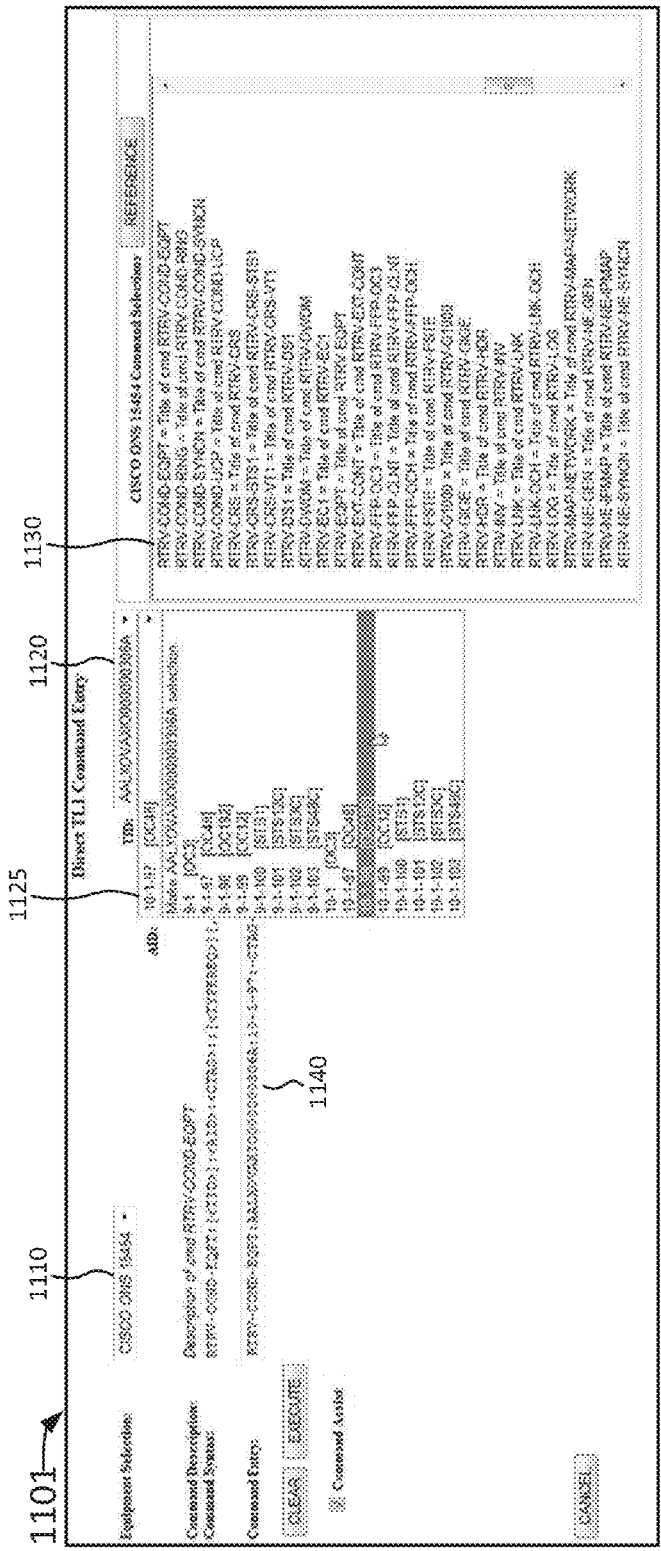
FIGS. 11A-11C are diagrams of user interfaces illustrating a fourth example of command building and execution according to an implementation described herein.
Figure 11B:
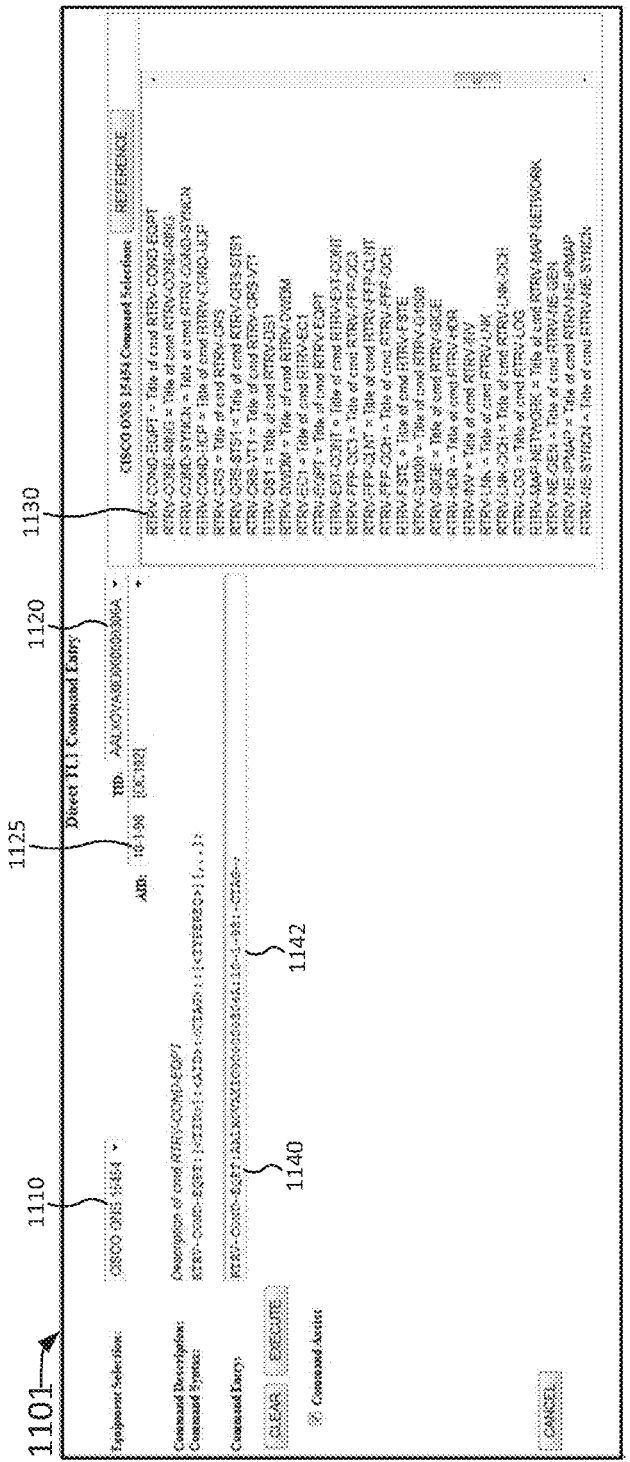
Figure 11C:
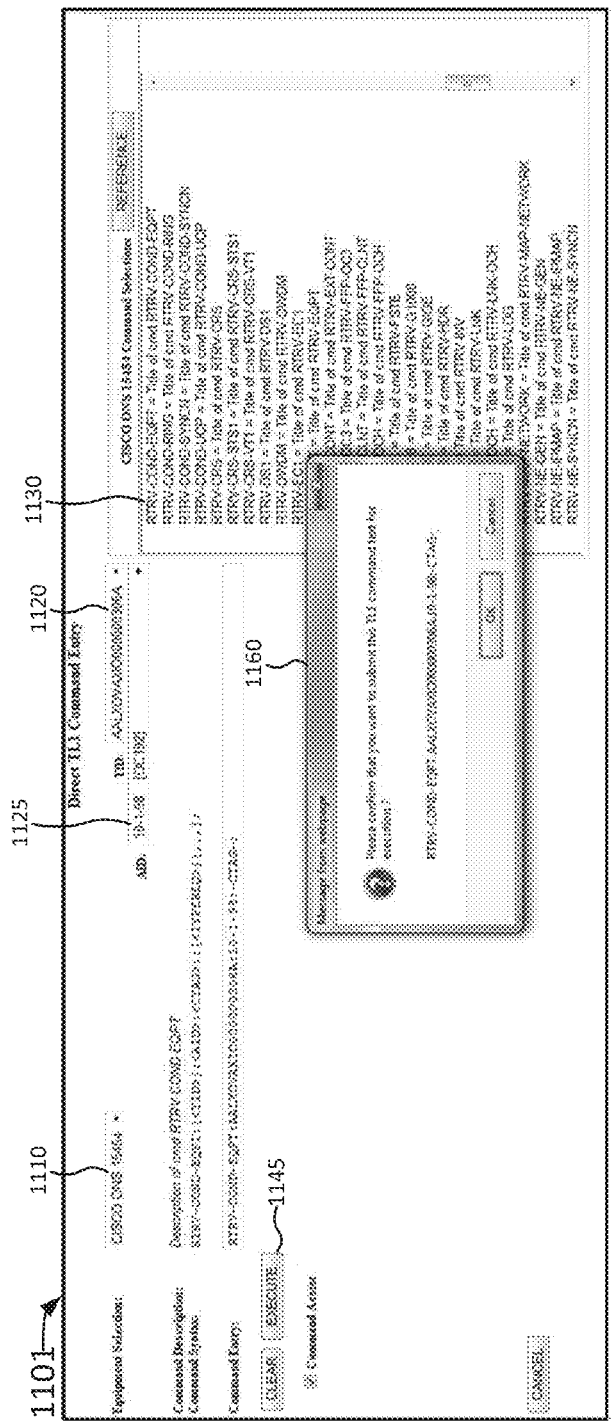

FIGS. 11A-11C are diagrams of a user interface 1101 illustrating a fourth example of command building and execution, using TL1 commands, according to an implementation described herein. The example of FIGS. 11A-11C shows that a user may re-use the same command and the same TID, while changing a single identifier, such as the AID identifier.

As shown in FIG. 11A, user interface 1101 may include an equipment selection menu 1110, a TID selection menu 1120, an AID selection menu 1125, a command selection menu 1130, and a command text box 1140. FIG. 11A illustrates user interface 1101 from the last executed command (from FIG. 10C) and after the user highlights another AID in AID selection menu 1125, as shown in keystroke sequence 1150 of FIG. 11A. FIG. 11B illustrates user interface 1101 after the user selects AID 1142. In response, the AID in the command from FIG. 9G may be replaced by the selected AID 1142, while the previously specified command name and the specified TID may remain in command text box 1140.

FIG. 11C illustrates user interface 1101 after the user presses execute key 1145. Command builder application 301 may generate message window 1160, asking the user to confirm that the user wants to send the completed command for execution. Once the user confirms, the completed command may be sent to command system 130. Command system 130 may send the completed command to equipment management system 140 for execution. In the example of FIGS. 11A-11C, the number of keystrokes entered by the user may be 3, compared to the 52 keystrokes required to type out the whole command.

FIGS. 12A-12D are diagrams of a user interface 1201 illustrating a fifth example of command building and execution, using TL1 commands, according to an implementation described herein. The example of FIGS. 12A-12D shows that command builder application 301 may handle domain specific matching. For example, some commands may specify a signal level in the command name. An AID may be related to a signal level, so that when an AID is selected, command builder application 301 may determine the command signal level based on the selected AID.

Figure 12A:
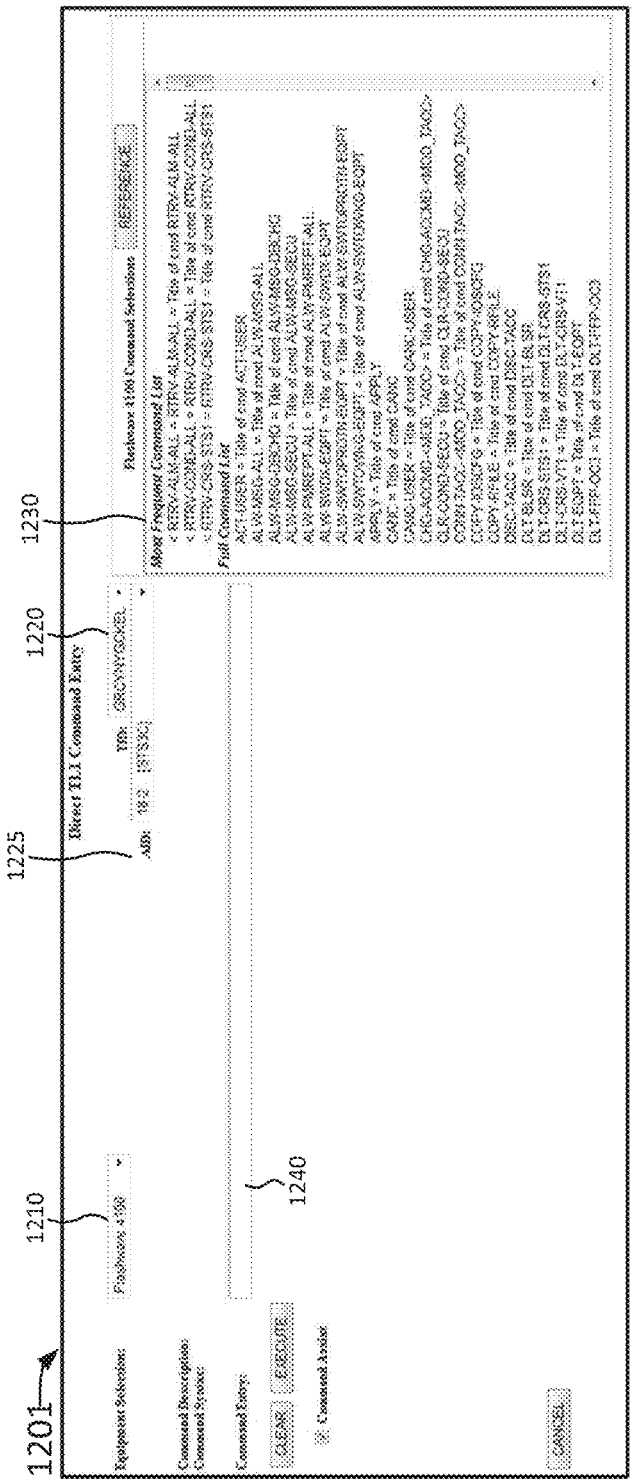
FIGS. 12A-12D are diagrams of user interfaces illustrating a fifth example of command building and execution according to an implementation described herein.

As shown in FIG. 12A, user interface 1201 may include an equipment selection menu 1210, a TID selection menu 1220, an AID selection menu 1225, a command selection menu 1230, and a command text box 1240. FIG. 12A illustrates user interface 1201 after the user has clicked on TID selection menu 1220, selected a TID, clicked on AID selection menu 1225, and selected an AID, as shown in keystroke sequence 1250 of FIG. 12A.

Figure 12B:
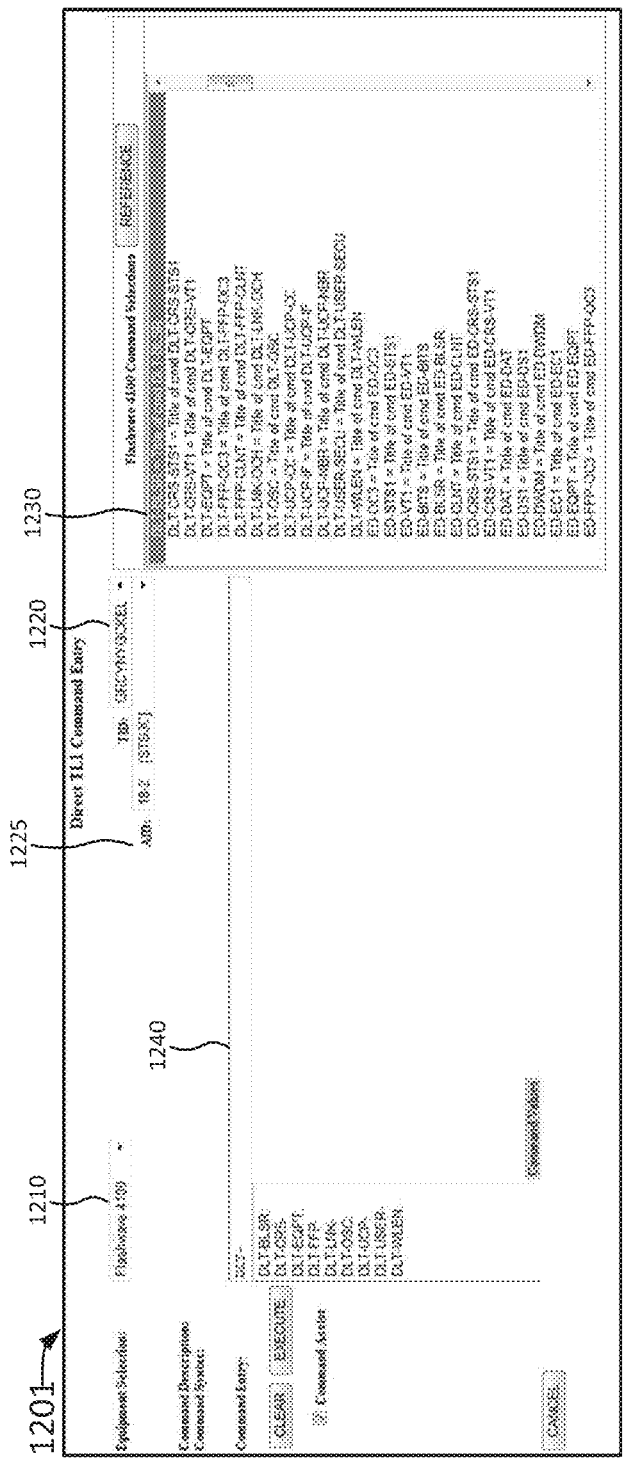
Figure 12C:
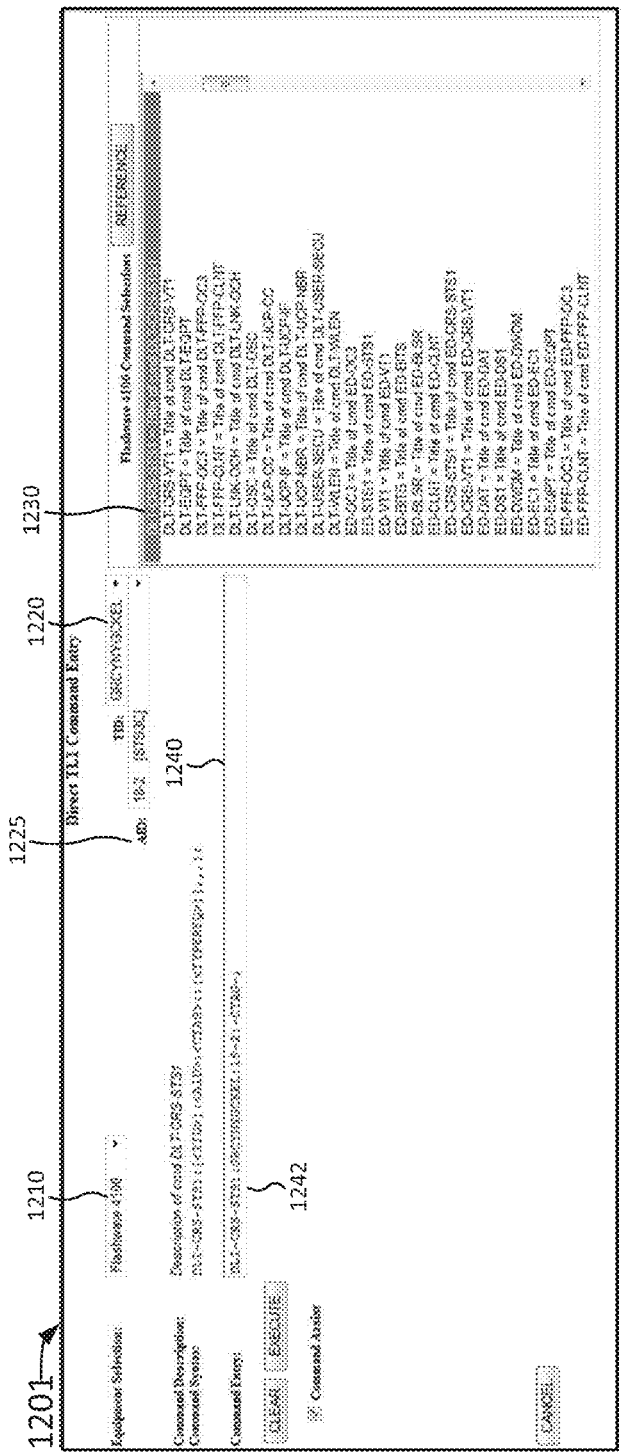

FIG. 12B illustrates user interface 1201 after the user enters the keys "D" and "L," as shown in keystroke sequence 1250 of FIG. 12B. In response, command builder application 301 may identify the DLT command and the list of commands shown by command text box 1240 may be reduced so that only commands beginning with the string "DLT" are included. FIG. 12C illustrates user interface 1201 after the user enters the key "C." In response, command builder application 301 may identify the CRS command string, the text in command text box 1240 may be completed to include the string "DLT-CRS." Furthermore, command builder application 301 may determine that the next command name component is related to a signal level and, using the selected AID, may identify the STS1 command string as corresponding to the signal level command name component. Command builder application 301 may recognize that the command name has been completed and that the delimiter ":" should be appended at the end of the command name. Furthermore, command builder application 301 may automatically append the selected TID, may append the delimiter ":", may automatically append the selected AID, and may append the delimiter ":". Command builder application 301 may determine that no other identifiers need to be specified and may append any remaining command fields.

Figure 12D:
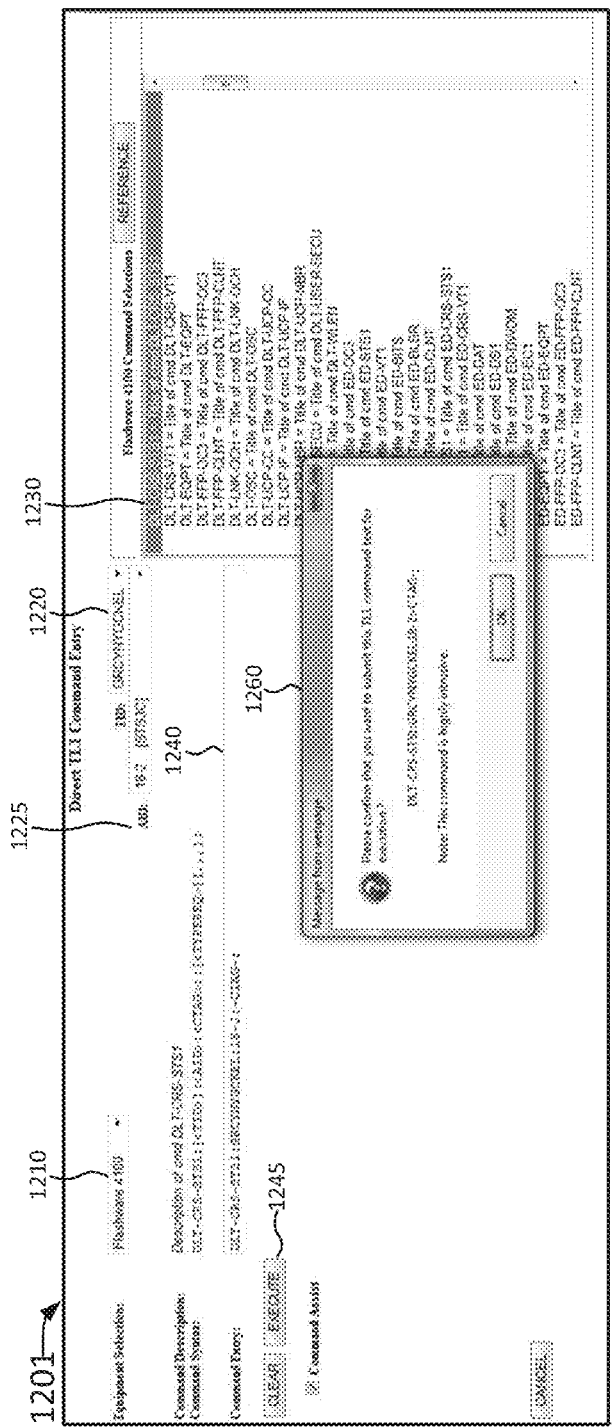

FIG. 12D illustrates user interface 1201 after the user presses execute key 1245. Command builder application 301 may generate message window 1260, asking the user to confirm that the user wants to send the completed command for execution. Furthermore, in this case, message window 1260 may include a warning that the command that is to be executed is highly intrusive. Once the user confirms, the completed command may be sent to command system 130. Command system 130 may send the completed command to equipment management system 140 for execution. In the example of FIGS. 12A-12D, the number of keystrokes entered by the user may be 4, compared to the 38 keystrokes required to type out the whole command.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5-7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   receiving, by the computer device, a selection of a circuit;
   obtaining, by the computer device, information relating to the selected circuit;
   providing, by the computer device, a list of network elements associated with the selected circuit based on the obtained information relating to the selected circuit;
   receiving, by the computer device, a selection of a network element type or network element identifier associated with the provided list of network elements;
   identifying, by the computer device, a list of commands based on the selection of a network element type or network element identifier;
   performing, by the computer device, a command auto-completion based on the identified list of commands, wherein performing the command auto-completion includes:
   providing a list of items,
   detecting a keystroke,
   reducing the list of items based on the detected keystroke,
   receiving a selection of an item from the reduced list of items, and
   displaying a next list of items based on a syntax associated with the selected item, wherein a particular one of the reduced list of items is associated with a different next list of items than another one of the reduced list of items;
   performing auto-completion of a network element identifier;
   performing auto-completion of an access identifier; and
   sending, by the computer device, a completed command to be executed on a network element identified by the completed command.

2. The method of claim 1, wherein performing the command auto-completion based on the identified list of commands further includes:
   performing auto-completion of a command name segment.

3. The method of claim 1, further comprising:
   determining if an item from the reduced list of items has been selected; and
   incorporating the selected item from the reduced list of items into a command text box, based on determining that the item has been selected.

4. The method of claim 1, wherein performing the auto-completion of the network element identifier includes:
   receiving a selection of the network element identifier associated with the provided list of network elements; and
   appending the selected network element identifier to a command name in the command text box based on receiving the selection of the network element identifier.

5. The method of claim 1, wherein performing the auto-completion of the access identifier includes:
   receiving a selection of a network element identifier associated with the provided list of network elements;
   providing a list of access identifiers associated with the selected network element identifier;
   receiving a selection of the access identifier from the provided list of access identifiers; and appending the selected access identifier to a command name in the command text box based on receiving the selection of the access identifier.

6. The method of claim 1, further comprising:
receiving a selection of another command;
appending a network element identifier, associated with the completed command, to the other command; and
appending an access identifier, associated with the completed command, to the other command.

7. The method of claim 5, wherein performing the command auto-completion based on the identified list of commands includes:
receiving a selection of an access identifier from the provided list of access identifiers; and
appending a signal level name to a command name in the command text box based on the selected access identifier.

8. The method of claim 1, wherein the completed command corresponds to a Transaction Language 1 command.

9. A computer device comprising:
logic configured to:
receive a selection of a circuit;
obtain information relating to the selected circuit;
provide a list of network elements associated with the selected circuit based on the obtained information relating to the selected circuit;
receive a selection of a network element type or network element identifier associated with the provided list of network elements;
identify a list of commands based on the selection of a network element type or network element identifier;
perform a command auto-completion based on the identified list of commands, wherein, when performing the command auto-completion, the logic is further configured to:
provide a list of items,
detect a keystroke,
reduce the list of items based on the detected keystroke,
receive a selection of an item from the reduced list of items, and
display a next list of items based on a syntax associated with the selected item, wherein a particular one of the reduced list of items is associated with a different next list of items than another one of the reduced list of items;
perform auto-completion of a network element identifier;
perform auto-completion of an access identifier; and
send a completed command to be executed on a network element identified by the completed command.

10. The computer device of claim 9, wherein when the logic is configured to perform the command auto-completion based on the identified list of commands, the logic is further configured to:
perform auto-completion of a command name segment.

11. The computer device of claim 9, wherein the logic is further configured to:
determine if an item from the reduced list of items has been selected; and
incorporate the selected item from the reduced list of items into a command text box, based on determining that the item has been selected.

12. The computer device of claim 9, wherein when the logic is configured to perform the auto-completion of the network element identifier, the logic is further configured to:
receive a selection of the network element identifier associated with the provided list of network elements; and
append the selected network element identifier to a command name in the command text box based on receiving the selection of the network element identifier.

13. The computer device of claim 9, wherein when the logic is configured to perform the auto-completion of the access identifier, the logic is further configured to:
receive a selection of a network element identifier associated with the provided list of network elements;
provide a list of access identifiers associated with the selected network element identifier;
receive a selection of the access identifier from the provided list of access identifiers; and
append the selected access identifier to a command name in the command text box based on receiving the selection of the access identifier.

14. The computer device of claim 9, wherein when the logic is further configured to:
receive a selection of another command;
append a network element identifier, associated with the completed command, to the other command; and
append an access identifier, associated with the completed command, to the other command.

15. The computer device of claim 13, wherein when the logic is configured to perform the command auto-completion based on the identified list of commands, the logic is further configured to:
receive a selection of an access identifier from the provided list of access identifiers; and
append a signal level name to a command name in the command text box based on the selected access identifier.

16. A non-transitory computer-readable medium storing instructions executable by one or more processors, the non-transitory computer-readable medium comprising:
one or more instructions to receive a selection of a circuit;
one or more instructions to obtain information relating to the selected circuit;
one or more instructions to provide a list of network elements associated with the selected circuit based on the obtained information relating to the selected circuit;
one or more instructions to receive a selection of a network element type or network element identifier associated with the provided list of network elements;
one or more instructions to identify a list of commands based on the selection of a network element type or network element identifier;
one or more instructions to perform a command auto-completion based on the identified list of commands, wherein, the one or more instructions to perform the command auto-completion include:
one or more instructions to provide a list of items,
one or more instructions to detect a keystroke,
one or more instructions to reduce the list of items based on the detected keystroke,
one or more instructions to receive a selection of an item from the reduced list of items, and
one or more instructions to display a next list of items based on a syntax associated with the selected item, wherein a particular one of the reduced list of items is associated with a different next list of items than another one of the reduced list of items;
one or more instructions to perform auto-completion of a network element identifier;

one or more instructions to perform auto-completion of an access identifier; and one or more instructions to send a completed command to be executed on a network element identified by the completed command.

17. The non-transitory computer-readable medium of claim 16, wherein the one or more instructions to perform the command auto-completion based on the identified list of commands further include:

one or more instructions to perform auto-completion of a command name segment.

18. The non-transitory computer-readable medium of claim 16, wherein the one or more instructions to perform the auto-completion of the access identifier further include:

one or more instructions to receive a selection of a network element identifier associated with the provided list of network elements;

one or more instructions to provide a list of access identifiers associated with the selected network element identifier;

one or more instructions to receive a selection of the access identifier from the provided list of access identifiers; and one or more instructions to append the selected access identifier to a command name in a command text box based on receiving the selection of the access identifier.

19. The non-transitory computer-readable medium of claim 16, further comprising:

one or more instructions to receive a selection of another command;

one or more instructions to append a network element identifier, associated with the completed command, to the other command; and one or more instructions to append an access identifier, associated with the completed command, to the other command.

20. The non-transitory computer-readable medium of claim 16, wherein the completed command corresponds to a Transaction Language 1 command.

* * * * *